US012769489B2

(12) United States Patent
Shimura

(10) Patent No.: US 12,769,489 B2
(45) Date of Patent: Oct. 20, 2026

(54) IMAGE FORMING SYSTEM AND METHOD FOR CONTROLLING SHEET PROCESSING IN IMAGE FORMING SYSTEM

(71) Applicant: KONICA MINOLTA, INC., Tokyo (JP)

(72) Inventor: Hiroshi Shimura, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 137 days.

(21) Appl. No.: 18/427,665

(22) Filed: Jan. 30, 2024

(65) Prior Publication Data

US 2024/0303004 A1 Sep. 12, 2024

(30) Foreign Application Priority Data

Mar. 8, 2023 (JP) ................................ 2023-035356

(51) Int. Cl.
*G06F 3/12* (2006.01)

(52) U.S. Cl.
CPC ............ *G06F 3/1204* (2013.01); *G06F 3/121* (2013.01); *G06F 3/1234* (2013.01)

(58) Field of Classification Search
CPC ....... G06F 3/1204; G06F 3/121; G06F 3/1234
See application file for complete search history.

(56) References Cited

U.S. PATENT DOCUMENTS 8,885,211 B1 * 11/2014 McDonnell ........... G06F 3/1285 358/1.9
10,129,441 B2 11/2018 Itagaki
2009/0086295 A1 4/2009 Murakami
2012/0315053 A1 12/2012 Kudo et al.
2013/0011151 A1 1/2013 Watanabe et al.
2013/0195534 A1 8/2013 Oohara et al.
2014/0029996 A1 1/2014 Nozawa
2017/0075272 A1 3/2017 Kimura
2018/0150008 A1 5/2018 Suzue (Continued)

FOREIGN PATENT DOCUMENTS

GB 2156277 A 10/1985
JP 2009-046218 A 3/2009

(Continued)

OTHER PUBLICATIONS

Notice of Reasons for Refusal dated May 26, 2026 issued in corresponding Japanese Patent Application No. 2023-035356, with English language translation thereof.

(Continued)

*Primary Examiner* — Nicholas Pachol
(74) *Attorney, Agent, or Firm* — SQUIRE PATTON BOGGS (US) LLP

(57) ABSTRACT

An image forming system includes an image former, a first reader, and a second reader. The image former forms an image on a recording medium. The first reader is disposed upstream of the image former in a conveyance direction of the recording medium, and reads the recording medium. The second reader is disposed downstream side of the image former in the conveyance direction of the recording medium, and reads the recording medium. Based on a result of reading the recording medium in one of the first reader and the second reader, the other of the first reader and the second reader is controlled.

12 Claims, 12 Drawing Sheets

(56) References Cited

U.S. PATENT DOCUMENTS

| | | | | |
|---|---|---|---|---|
| 2019/0324696 | A1* | 10/2019 | Matsuda | G06F 3/1215 |
| 2020/0356318 | A1* | 11/2020 | Wei | G06F 3/1234 |
| 2021/0141572 | A1* | 5/2021 | Kuroda | G06F 3/1288 |
| 2022/0156019 | A1* | 5/2022 | Kanamoto | G06F 3/1259 |
| 2022/0156020 | A1* | 5/2022 | Iida | G06F 3/1287 |
| 2022/0201150 | A1 | 6/2022 | Manabe | |
| 2022/0253260 | A1 | 8/2022 | Tanaka | |
| 2022/0263963 | A1 | 8/2022 | Aoyagi et al. | |
| 2022/0308800 | A1* | 9/2022 | Takahashi | B41J 3/543 |
| 2022/0334520 | A1 | 10/2022 | Nishi | |
| 2023/0035820 | A1* | 2/2023 | Kimata | G06F 3/1256 |
| 2023/0095964 | A1 | 3/2023 | Mine et al. | |
| 2024/0302778 | A1 | 9/2024 | Yamashita | |
| 2024/0303004 | A1 | 9/2024 | Shimura | |
| 2024/0305720 | A1* | 9/2024 | Yamashita | H04N 1/00713 |

FOREIGN PATENT DOCUMENTS

| | | | |
|---|---|---|---|
| JP | 2010-066516 | A | 3/2010 |
| JP | 2020-116752 | A | 8/2020 |
| JP | 2021-105629 | A | 7/2021 |

OTHER PUBLICATIONS

Final Office Action dated Jun. 30, 2026 issued in co-pending U.S. Appl. No. 18/593,737.

* cited by examiner

IMAGE FORMING SYSTEM AND METHOD FOR CONTROLLING SHEET PROCESSING IN IMAGE FORMING SYSTEM

CROSS-REFERENCE TO RELATED APPLICATION

Japanese patent application No. 2023-035356 filed on Mar. 8, 2023, including description, claims, drawings, and abstract the entire disclosure is incorporated herein by reference in its entirety.

BACKGROUND OF THE INVENTION

1. Technical Field

The present invention relates to an image forming system and a method for controlling an image forming system.

2. Description of Related Art

In recent years, in the production/printing field, there has been an active development of a technology for improving printing quality and stabilizing image quality. As one of such technologies, there is an image forming system having an automatic inspection function of automatically inspecting an image of a product (for example, Japanese Unexamined Patent Application Publication No. 2010-66516).

In such an image forming system, an image (hereinafter, referred to as "reference image") of a product preliminarily confirmed to have satisfactory image quality by a user is compared with a scanned image of the product printed in the printing. Thus, it is determined whether the product printed in the printing has sufficient quality.

SUMMARY OF THE INVENTION

However, the image forming system described in Japanese Unexamined Patent Application Publication No. 2010-66516 does not determine whether the sheet is to be inspected. For this reason, for example, inspection is also performed on an embossed sheet having an uneven surface, an index sheet having a shape different from that of a normal sheet, a base portion of a sheet having a base image, and the like. As a result, the comparison with the reference image is not appropriately performed, and an erroneous determination may occur. Therefore, there is a problem in that it takes time and effort for the user to check an inspection error due to the erroneous determination.

The present invention has been made in consideration of the above-described issue, and an object of the present invention is to provide an image forming system and a method for controlling an image forming system that can suppress or reduce time and effort required for a user to check an inspection error due to erroneous determination.

To achieve at least one of the abovementioned objects, according to an aspect of the present invention, an image forming system reflecting one aspect of the present invention comprises the followings.

An image forming system including: an image former that forms an image on a recording medium; a first reader that is disposed upstream of the image former in a conveyance direction of the recording medium and reads the recording medium; and a second reader that is disposed downstream of the image former in the conveyance direction of the recording medium and reads the recording medium, in which one of the first reader and the second reader is controlled based on a result of reading the recording medium in the other of the first reader and the second reader.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION

Figure 1:
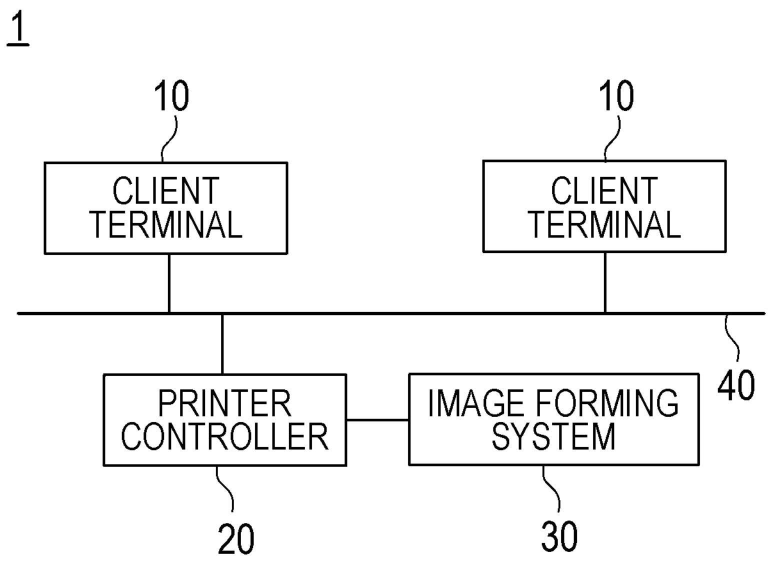
FIG. 1 is a schematic block diagram of a printing system according to a first embodiment of the present invention.

Hereinafter, one or more embodiments of the present invention will be described with reference to the drawings. However, the scope of the invention is not limited to the disclosed embodiments.

In the description of the drawings, the same components are denoted by the same reference signs, and redundant descriptions are omitted. In addition, dimensional ratios in the drawings are exaggerated for convenience of description and may be different from actual ratios.

First Embodiment

Configuration of Printing System

FIG. 1 is a schematic block diagram for explaining a configuration of a printing system 1 according to a first embodiment of the present invention. As illustrated in FIG. 1, the printing system 1 includes a client terminal 10, a printer controller 20, and an image forming system 30. The client terminal 10, the printer controller 20, and the image forming system 30 are communicably connected to each other via a communication line 40.

The client terminal 10 may be, for example, a personal computer, a tablet terminal, a smartphone, or the like. A printer driver for converting document data into a print job is installed in the client terminal 10. The printer driver generates the print job in a format compatible with the printer controller 20, and transmits the print job to the printer controller 20 via the communication line 40.

The print job includes, for example, print setting data and print data in a page description language (PDL) format. The print setting data includes information about the number of pages, the number of copies, the type, size, and grammage of a sheet, the setting of an inspection function, the setting of single-sided printing/double-sided printing, and the like.

The communication line 40 may include a local area network (LAN) in which computers or network devices are connected to each other according to standards such as Ethernet (registered trademark), fiber distributed data interface (FDDI), and wireless fidelity (Wi-Fi), a wide area network (WAN) in which LANs are connected to each other by a dedicated line, or the like.

Note that the number of constituent elements connected to the communication line 40 is not limited to the example illustrated in FIG. 1.

Configuration of Printer Controller

Figure 2:
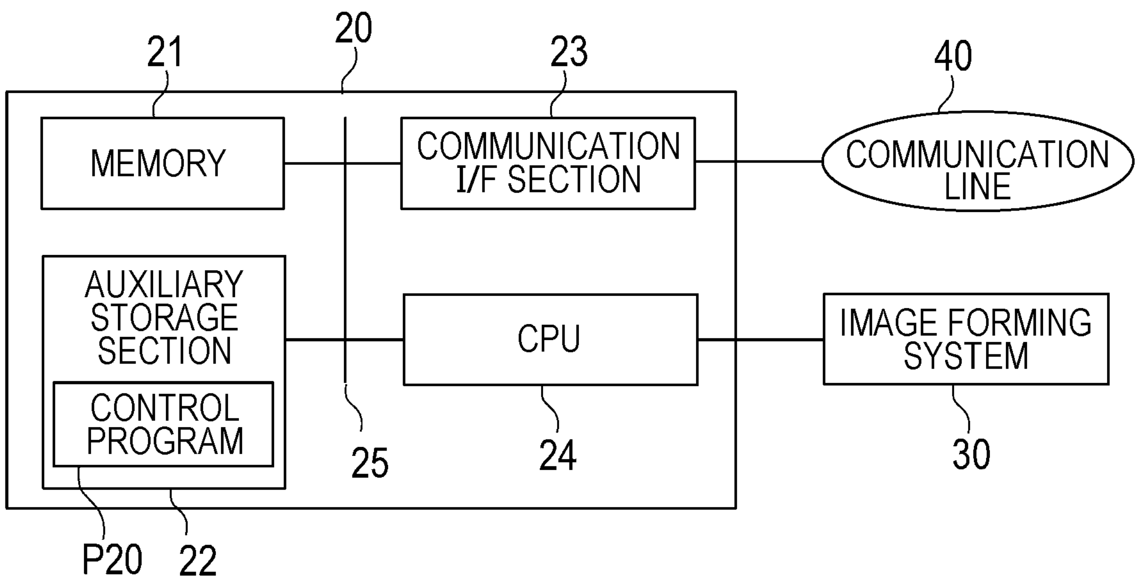
FIG. 2 is a schematic block diagram illustrating a hardware configuration of a printer controller illustrated in FIG. 1.

FIG. 2 is a schematic block diagram illustrating a hardware configuration of the printer controller 20 illustrated in FIG. 1. The printer controller 20 generates print image data and transmits the print image data to the image forming system 30.

The printer controller 20 includes a memory 21, an auxiliary storage section 22, a communication I/F section 23, and a central processing unit (CPU) 24, and these constituent elements are connected to each other via an internal bus 25. The memory 21 includes a random access memory (RAM) and a read only memory (ROM) (not illustrated). The RAM is a high-speed accessible main storage device that serves as a work area and temporarily stores a program and data received and to be transmitted. The ROM stores various programs and various data.

The auxiliary storage section 22 includes, for example, a large-capacity storage device such as a solid state drive (SSD) or a hard disk drive (HDD), and stores various programs including an operating system, a control program P20, and the like.

The communication I/F section 23 is an interface for transmitting and receiving data to and from the client terminal 10 via the communication line 40.

In order to generate the print image data and control the communication I/F section 23 and the image forming system 30 in accordance with the various programs, the CPU 24 executes various determination processes and calculation processes. Functions of the printer controller 20 are implemented by the CPU 24 executing the control program P20. The printer controller 20 analyzes the print job received from the client terminal 10 via the communication line 40. The printer controller 20 performs processing such as color conversion, screening, and rasterizing, and generates the print image data in a bitmap format.

Configuration of Image Forming System

Figure 3:
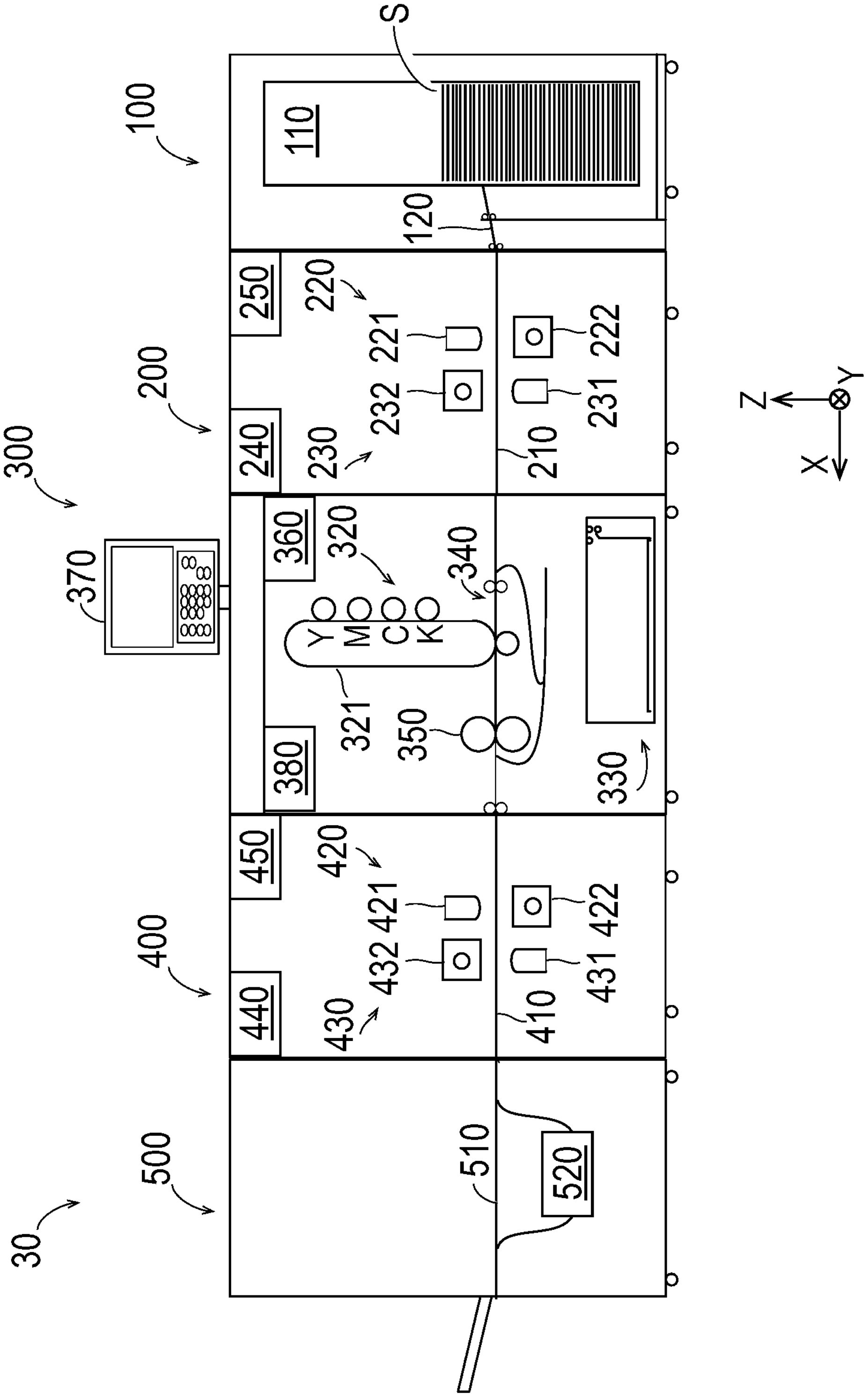
FIG. 3 is a diagram illustrating a schematic configuration of an image forming system illustrated in FIG. 1.
Figure 4:
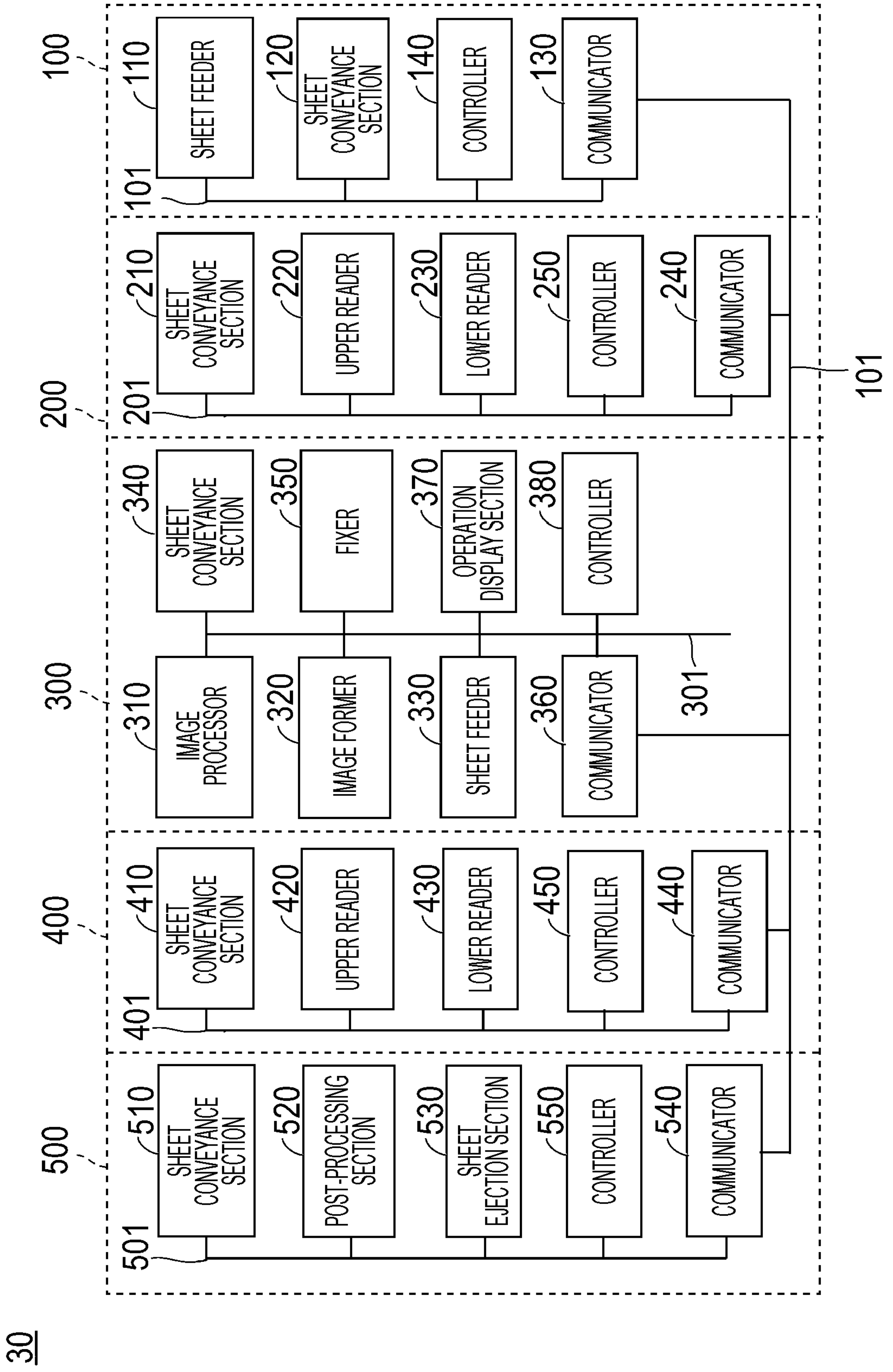
FIG. 4 is a schematic block diagram of the image forming system illustrated in FIG. 1.
Figure 5:
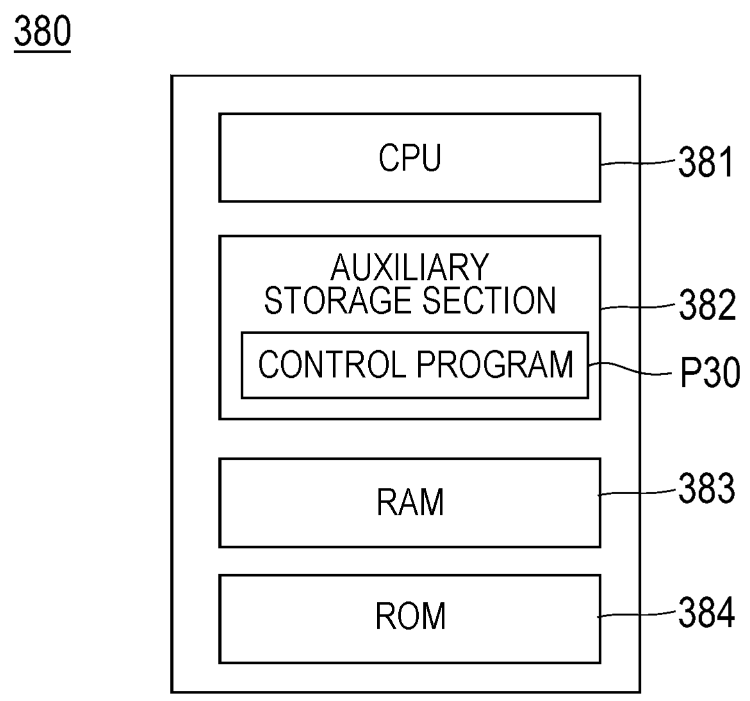
FIG. 5 is a schematic block diagram illustrating a configuration of a controller of the image forming system illustrated in FIG. 4.

FIG. 3 is a diagram illustrating a schematic configuration of the image forming system 30 illustrated in FIG. 1, and FIG. 4 is a schematic block diagram of the image forming system 30 illustrated in FIG. 1. FIG. 5 is a schematic block diagram illustrating a configuration of a controller 380 of the image forming system 30 illustrated in FIG. 4.

As illustrated in FIG. 3, the image forming system 30 according to the present embodiment includes a sheet feed device 100, a first reading device 200, an image forming apparatus 300, a second reading device 400, and a post-processing apparatus 500 which are connected in series in an X direction (sheet conveyance direction). Note that the configuration of the image forming system 30 illustrated in FIGS. 3 and 4 is an example, and the types and the number of devices included in the image forming system 30 are not limited to those illustrated in FIG. 1.

Sheet Feed Device 100

The sheet feed device 100 supplies a sheet as a recording medium to the first reading device 200 in response to an instruction of the image forming apparatus 300. As illustrated in FIG. 4, the sheet feed device 100 includes a sheet feeder 110, a sheet conveyance section 120, a communicator 130, and a controller 140. The sheet feeder 110, the sheet conveyance section 120, the communicator 130, and the controller 140 are connected to each other via an internal bus 101.

The sheet feeder 110 includes at least one sheet feed tray and stores sheets which are used for printing. In a case where a plurality of sheet feed trays are provided, the sheet feed trays may be configured to store sheets having different sizes. Sheets S stored on the sheet feed tray are supplied one by one to the first reading device 200 by a plurality of conveyance roller pairs along a sheet conveyance path of the sheet conveyance section 120. The sheets S may be not only a white sheet used for forming an image but also a partition sheet used for partitioning two consecutive sheets (white sheets). The partition sheet is a sheet that can be distinguished from the other sheets by a user based on, for example, color, size, thickness, and the like of the partition sheet.

The communicator 130 exchanges a control signal and data with the image forming apparatus 300. The controller 140 controls the sheet feeder 110, the sheet conveyance section 120, and the communicator 130 by executing a control program for the sheet feed device 100.

First Reading Device 200

In response to an instruction from the controller 380, the first reading device 200 reads a sheet S conveyed from the sheet feed device 100. The first reading device 200 includes a sheet conveyance section 210, an upper reader 220, a lower reader 230, a communicator 240, and a controller 250. These constituent elements are communicably connected to each other via an internal bus 201. The upper reader 220 and/or the lower reader 230 constitute a first reader.

The sheet conveyance section 210 includes a sheet conveyance path and a plurality of conveyance roller pairs and conveys the sheet S supplied from the sheet feed device 100 toward the image forming apparatus 300 along the sheet conveyance path.

The upper reader 220 includes an upper scanner 221 disposed on the upper side of the sheet conveyance path of the sheet conveyance section 210, and a first background member 222 arranged opposite to the upper scanner 221 and disposed on the lower side of the sheet conveyance path. The lower reader 230 includes a lower scanner 231 disposed on the lower side of the sheet conveyance path of the sheet conveyance section 210, and a second background member 232 arranged opposite to the lower scanner 231 and disposed on the upper side of the sheet conveyance path.

The upper scanner 221 includes an optical system including an image sensor, a lens, and a mirror, and a light emitting diode (LED) that is a light source. Furthermore, the lower scanner 231 has the same configuration as that of the upper scanner 221. The upper scanner 221 and the lower scanner 231 are configured to be operable independently of each other.

The image sensor may be, for example, a charge coupled device (CCD) line sensor or a complementary metal oxide semiconductor (CMOS) line sensor. Each of the upper scanner 221 and the lower scanner 231 may include a contact image sensor (CIS).

The first background member 222 is, for example, a member having a prismatic shape (for example, a quadrangular prism shape), and a plurality of side surfaces of the first background member 222 have different colors (for example, black and white). A controller of the upper reader 220 controls a drive source (not illustrated) to rotate a central shaft of the first background member 222. Thus, the controller of the upper reader 220 can change a background to be used for reading the sheet S to a different color (black or white). For example, to read a white or light-colored sheet S, the black surface of the first background member 222 can be used as the background. To read a black or dark sheet S, the white surface of the first background member 222 can be used as the background. This increases the contrast between the color of the sheet S and the color of the first background member 222. Therefore, the outline of the four sides of the sheet S becomes clear. The second background member 232 has the same configuration as that of the first background member 222.

The communicator 240 exchanges a control signal and read image data between the upper scanner 221 and the lower scanner 231, and the image forming apparatus 300.

The controller 250 includes a CPU, memories (RAM and ROM), an auxiliary storage section, and the like (not illustrated), and executes a control program of the first reading device 200. Thus, the controller 250 controls the sheet conveyance section 210, the upper reader 220, the lower reader 230, and the communicator 240. The controller 250 controls the optical system and the light source, thereby implementing various functions as a color scanner such as reading of a color image.

Image Forming Apparatus 300

The image forming apparatus 300 receives the print image data from the printer controller 20, and prints an image on the sheet S based on the print image data. The received print image data is stored in an auxiliary storage section 382.

The image forming apparatus 300 includes an image processor 310, an image former 320, a sheet feeder 330, a sheet conveyance section 340, a fixer 350, a communicator 360, an operation display section 370, and a controller 380. These constituent elements are communicably connected to each other via an internal bus 301.

The image processor 310 performs image processing, such as gamma correction, screen correction, and density balance, on the print image data received by the communicator 360. The image processor 310 transmits the processed image data to the image former 320.

The image former 320 forms the image on the sheet S based on the image data using a known image forming process such as an electrophotographic method including charging, exposing, developing, and transferring. The image former 320 includes, for each color of yellow (Y), magenta (M), cyan (C), and black (K), a photosensitive drum as an image bearing member, and a charging section, an optical writing section, a developing device, and a transfer section that are disposed around the photosensitive drum.

Toner images in respective colors of yellow (Y), magenta (M), cyan (C), and black (K) are formed on the respective photosensitive drums. The toner images are sequentially superimposed and primarily transferred to an intermediate transfer belt 321 of the transfer section. The toner images primarily transferred to the intermediate transfer belt 321 are secondarily transferred to the sheet S.

The sheet feeder 330 supplies the sheet to the image former 320. The sheet feeder 330 includes a plurality of sheet feed trays. The sheet feed trays can store, for example, sheets of different sizes such as A4 and A3 sizes.

The sheet conveyance section 340 includes a sheet conveyance path and a plurality of conveyance roller pairs and conveys the sheet S in the image forming apparatus 300. The sheet conveyance section 340 also includes a sheet reversing section and a circulation conveyance section. The sheet conveyance section 340 can turn over and eject the sheet S to which an image has been fixed, or can form an image on both sides of the sheet S.

The fixer 350 fixes, to the sheet S, the toner images formed on the sheet S. The fixer 350 includes a hollow heating roller in which a heater is disposed, and a pressure roller facing the heating roller. The heating roller and the pressure roller are controlled at a predetermined temperature (for example, 160° C. or more) by the heater and apply heat and pressure to the sheet S to fix the toner images to the sheet S.

The sheet S having the images fixed thereto is supplied to the second reading device 400 through a sheet ejection section (not illustrated).

The communicator 360 is connected to, for example, the printer controller 20 via a network, and transmits and receives data such as the print image data.

The operation display section 370 includes an input section and an output section. The input section includes, for example, a keyboard, buttons, and a touch screen. The input section is used for the user to perform character input by the keyboard, various settings, and various instructions (inputs) such as an instruction to start printing by a print start button. The output section includes a display and is used to present the user with an execution status of the print job and the like.

The controller 380 controls the image processor 310, the image former 320, the sheet feeder 330, the sheet conveyance section 340, the fixer 350, the communicator 360, and the operation display section 370. As illustrated in FIG. 5, the controller 380 includes a CPU 381, the auxiliary storage section 382, a RAM 383, and a ROM 384.

The CPU 381 implements various functions by executing a control program P30 for the image forming apparatus 300. The control program P30 is stored in the auxiliary storage section 382 and is loaded into the RAM 383 when the control program P30 is to be executed by the CPU 381. The auxiliary storage section 382 includes, for example, a large-capacity storage device such as an SSD and an HDD. The RAM 383 stores a result of calculation performed in response to the execution by the CPU 381, and the like. The ROM 384 stores various parameters, various programs, and the like.

Second Reading Device 400

The second reading device 400 reads an image (image based on the print image data) printed on the sheet S conveyed from the image forming apparatus 300 in response to an instruction from the controller 380. The second reading device 400 includes a sheet conveyance section 410, an upper reader 420, a lower reader 430, a communicator 440, and a controller 450. These constituent elements are communicably connected to each other via an internal bus 401. The sheet conveyance section 410, the communicator 440, and the controller 450 have the same configurations as those of the sheet conveyance section 210, the communicator 240, and the controller 250, respectively, in the first reading device 200. Therefore, detailed description of the sheet conveyance section 410, the communicator 440, and the controller 450 will be omitted. The upper reader 420 and/or the lower reader 430 constitute a second reader.

The upper reader 420 includes an upper scanner 421 disposed on the upper side of a sheet conveyance path of the sheet conveyance section 410, and a first background member 422 arranged opposite to the upper scanner 421 and disposed on the lower side of the sheet conveyance path. The lower reader 430 includes a lower scanner 431 disposed on the lower side of the sheet conveyance path of the sheet conveyance section 410, and a second background member 432 arranged opposite to the lower scanner 431 and disposed on the upper side of the sheet conveyance path.

While the sheet S is being conveyed on the sheet conveyance path by the sheet conveyance section 410, the upper scanner 421 reads an image formed on the front surface of the sheet S with an image sensor, thereby acquiring read image data of the front surface of the sheet S. Furthermore, while the sheet S is being conveyed on the sheet conveyance path by the sheet conveyance section 410, the lower scanner 431 reads an image formed on the back surface of the sheet S with an image sensor, thereby acquiring read image data of the back surface of the sheet S. The read image data of the front surface and the back surface read by the upper scanner 421 and the lower scanner 431 is transmitted to the controller 380 of the image forming system 30.

Further, in the present embodiment, the second reading device 400 acquires the positions of the images formed on the sheet S by the image forming apparatus 300 and transmits the acquired positions to the controller 380. For example, the upper scanner 421 acquires the read image data of the front surface of the sheet S. The upper scanner 421 calculates position information (for example, upper left and lower right coordinates) of an image region (each image region in a case where a plurality of image regions are present) on the sheet S, and transmits the position information to the controller 380.

Post-Processing Apparatus 500

In response to an instruction from the controller 380, the post-processing apparatus 500 conveys or post-processes the sheet S supplied from the second reading device 400, and ejects the sheet S to the outside of the image forming system 30. The post-processing apparatus 500 includes a sheet conveyance section 510, a post-processing section 520, a sheet ejection section 530, a communicator 540, and a controller 550. These constituent elements are communicably connected to each other via an internal bus 501.

The sheet conveyance section 510 includes a sheet conveyance path and a plurality of conveyance roller pairs. The sheet conveyance section 510 conveys the sheet S supplied from the second reading device 400 along the sheet conveyance path, and supplies the sheet S to the post-processing section 520 or the sheet ejection section 530.

The post-processing section 520 performs post-processing on the conveyed sheet S. Examples of the post-processing include punching, cutting, and the like.

The sheet ejection section 530 includes a sheet ejection tray and a sheet ejection roller pair. The sheet ejection section 530 ejects the sheet S supplied from the second reading device 400 and conveyed along the sheet conveyance path or subjected to the post-processing to the sheet ejection tray.

The communicator 540 exchanges a control signal and data between the controller 550 and the image forming apparatus 300. The controller 550 controls the sheet conveyance section 510, the post-processing section 520, the sheet ejection section 530, and the communicator 540. The hardware configuration of the controller 550 is the same as the hardware configuration of the controller 380, and thus a detailed description thereof will be omitted.

Method for Controlling Image Forming System 30

Figure 6:
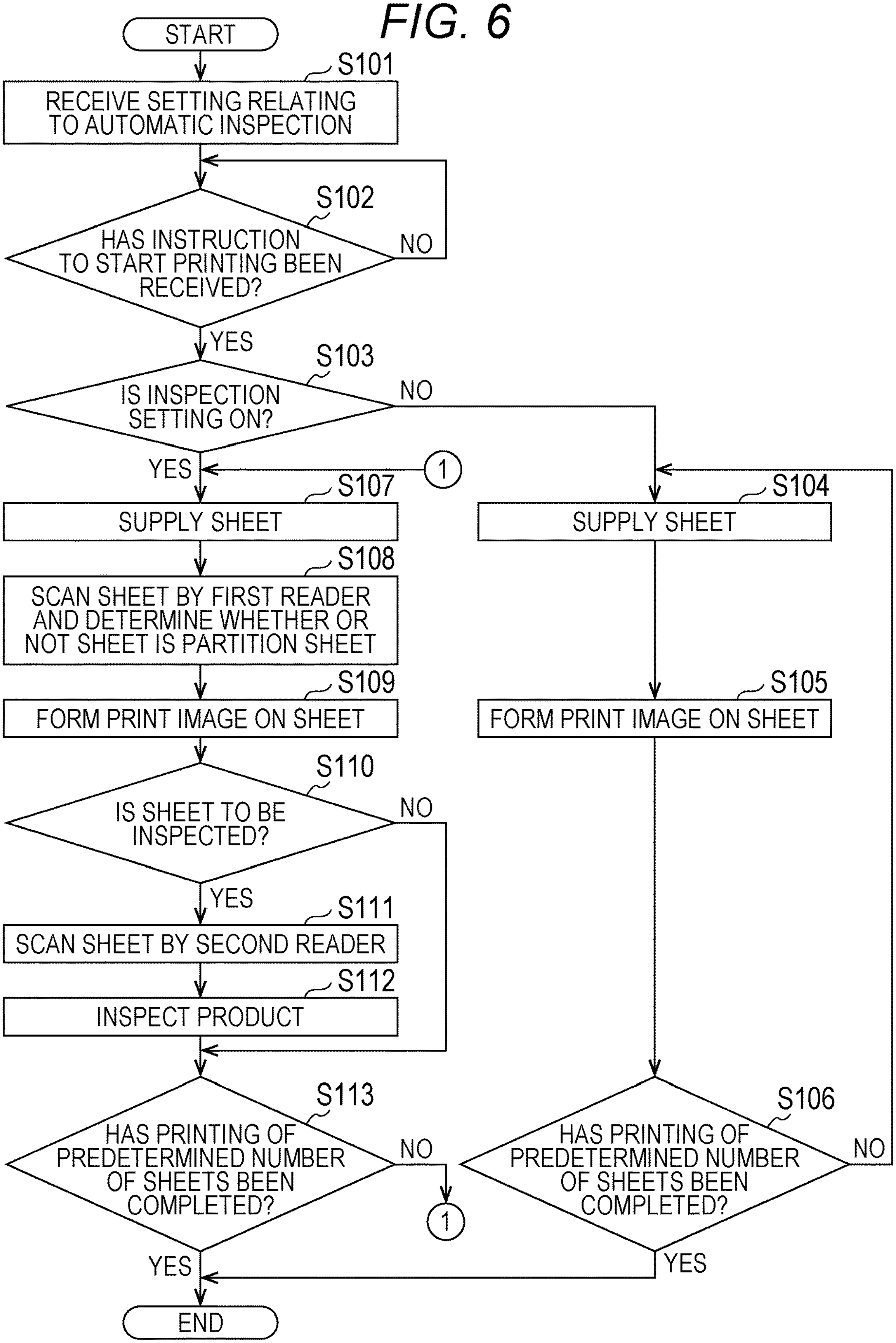
FIG. 6 is a flowchart illustrating a process procedure of a method for controlling the image forming system according to the first embodiment.

Referring to FIG. 6, a method for controlling the image forming system 30 according to the present embodiment will be described. FIG. 6 is a flowchart illustrating a process procedure of the method for controlling the image forming system 30 according to the present embodiment. The process illustrated in FIG. 6 is implemented by the cooperation of the controllers 140, 250, 380, 450, and 550, and the controller 380 plays a leading role in overall control and the like.

The controller 380 receives a setting relating to automatic inspection (step S101). Before performing main printing, a user edits a job ticket and inputs the setting relating to the automatic inspection via the operation display section 370. The image forming system 30 according to the present embodiment includes an automatic inspection function as one function in the output of the print job, and can automatically perform inspection using a reference image (correct image) in the main printing. Although not illustrated, the user can set the setting relating to the automatic inspection on an automatic inspection setting screen. For example, the user can switch from a job ticket editing screen for editing the job ticket to the automatic inspection setting screen by a predetermined operation. On the automatic inspection setting screen, the user can set on/off of the automatic inspection function, and can set whether to newly create a reference image to be used for inspection or to select the reference image from registered images. The reference image can be, for example, an image whose quality has been confirmed by the user among read images generated by reading, by the second reader, a print image formed on a sheet by the image forming apparatus 300.

Furthermore, the user needs to set the position of an image to be formed on a sheet as information necessary for automatic inspection. As described above, in the present embodiment, the position of the image to be formed on the sheet can also be acquired based on image data of the sheet read by the second reading device 400 instead of the user manually inputting the position. Thus, it is possible to save time and effort for the user to manually input the position of the image to be formed on the sheet.

Next, the controller 380 determines whether or not an instruction to start printing has been received (step S102). More specifically, when an output button is pressed on the job ticket edit screen or another screen, or when the print start button of the operation display section 370 is pressed, the controller 380 determines that the instruction to start printing has been received.

When the instruction to start printing has not been received (step S102: NO), the controller 380 waits until the instruction to start printing is given. On the other hand, when the instruction to start printing has been received (step S102: YES), the controller 380 determines whether an inspection setting is on (step S103). When the inspection setting is not on, that is, when the inspection setting is off (step S103: NO), the controller 380 controls the sheet feed device 100 to supply the sheet S to the first reading device 200 (step S104). The sheet feed device 100 feeds the sheet S to the first reading device 200. Since the inspection setting is off, the controller 250 controls the first reader and the sheet conveyance section 210 so as to convey the sheet S toward the image forming apparatus 300 without reading the sheet S.

Next, the image forming apparatus 300 forms a print image on the sheet S (step S105). More specifically, the controller 380 controls the image former 320 to form the print image on the sheet S conveyed from the first reading device 200, based on the print image data stored in the auxiliary storage section 382.

Next, the controller 380 determines whether or not printing of a predetermined number of sheets has been completed (step S106). When the printing of the predetermined number of sheets has been completed (step S106: YES), the controller 380 ends the process (end). On the other hand, when the printing of the predetermined number of sheets has not been completed (step S106: NO), the controller 380 returns the process to the processing in step S104 and continues the supply of a sheet S and the formation of an image.

On the other hand, when the inspection setting is on (step S103: YES), the controller 380 controls the sheet feed device 100 to supply the sheet S to the first reading device 200 (step S107). The sheet feed device 100 feeds the sheet S to the first reading device 200.

Next, the first reading device 200 scans the sheet S and determines whether or not the sheet S is a partition sheet (step S108). For example, in the main printing, it is assumed that a color sheet (colored sheet) is used as the partition sheet and a white sheet is used for image formation. For example, the controller 250 reads the sheet S supplied from the sheet feed device 100 by the first reader, and determines a color of the sheet S based on read image data of the sheet S. The controller 250 determines that the sheet S is the partition sheet when the color sheet is passed while white sheets are continuously passed as a result of determining the colors of the plurality of continuously supplied sheets. A result of determination as to whether or not the sheet S is the partition sheet, that is, a result of the reading by the first reader is transmitted to the controller 380.

Next, the image former 320 forms a print image on the sheet S (step S109). More specifically, the controller 380 controls the image former 320 to form the print image on the sheet S conveyed from the first reading device 200, based on the print image data stored in the auxiliary storage section 382. Note that although the case where the white sheet is used for the image formation and the color sheet is used as the partition sheet is assumed in the present embodiment, the image can also be formed on the partition sheet (color sheet).

Next, the controller 380 determines, based on the result of the reading by the first reader, whether or not the sheet S is to be inspected (step S110). For example, when the sheet S is the partition sheet, the controller 380 determines that the sheet S is not to be inspected. The controller 380) may also be configured to determine that, for example, an embossed sheet, an index sheet, and a sheet with punched holes are not to be inspected (that is, sheets not to be inspected), in addition to the partition sheet.

The controller 380 transmits, to the controller 450, a result of the determination as to whether or not the sheet S is not to be inspected. When the sheet S is to be inspected (step S110: YES), the controller 450) controls the second reader to scan the sheet S (step S111). The controller 450 reads, by the second reader, the sheet S on which the image has been formed by the image forming apparatus 300, that is, a product, and transmits read image data of the product to the controller 380.

Next, the controller 380 inspects the product (step S112). Specifically, the controller 380 compares the reference image with the image on the product on a page-by-page basis, and determines whether or not the product satisfies a predetermined quality based on the degree of match between the two images. For example, the controller 380) determines that the product satisfies the predetermined quality when the degree of match between the two images is a predetermined threshold or more, and determines that the product does not satisfy the predetermined quality when the degree of match between the two images is less than the threshold. In order to distinguish between a product that does not satisfy the predetermined quality and a normal product, the product that does not satisfy the predetermined quality may be ejected to a purge tray (not illustrated) of the post-processing apparatus 500.

Next, the controller 380 determines whether or not printing of a predetermined number of sheets has been completed (step S113). When the printing of the predetermined number of sheets has been completed (step S113: YES), the controller 380 ends the process (end). On the other hand, when the printing of the predetermined number of sheets has not been completed (step S113: NO), the controller 380 returns the process to the processing in step S107.

On the other hand, when the controller 380 determines that the sheet S is not to be inspected (step S110: NO), the controller 380 advances the process to the processing in step S113 without performing the processing in steps S111 and S112. That is, the controller 450 controls the second reader and the sheet conveyance section 410 so as to convey the sheet S toward the post-processing apparatus 500 without reading the image on the sheet S.

As described above, in the process illustrated in the flowchart of FIG. 6, when the inspection setting is on, the controller 250 controls the first reader to read the sheet S fed from the sheet feed device 100, and determines, based on a result of the reading by the first reader, whether or not the sheet S is the partition sheet. The controller 380 determines whether or not the sheet S is to be inspected, based on the result (the result of the reading by the first reader) of determining whether or not the sheet S is the partition sheet. When the sheet S is to be inspected, the controller 450 controls the second reader to read the image on the sheet S, whereas when the sheet S is not to be inspected, the controller 450 controls the second reader not to read the image on the sheet S. Furthermore, the controller 380 performs control such that the product is inspected when the sheet S is to be inspected, and the product is not inspected when the sheet S is not to be inspected. Each process from the supply of a sheet S to the inspection of a product is repeated for a predetermined number of sheets designated by the print setting data for each page of the print image data.

In the above description, the case where the controller 450 controls whether or not the second reader reads the sheet S based on the result of reading the sheet S in the first reader has been exemplified, but the present embodiment is not limited to such a case. The controller 380 may be configured to control whether or not to read the sheet S by the second reader based on the result of reading the sheet S in the first reader.

The image forming system 30 according to the present embodiment configured as described above produces the following effects.

When the sheet S is not to be inspected based on the result of reading the sheet S in the first reader, the second reader is controlled not to read the sheet which is not to be inspected, and/or is controlled not to inspect the sheet which is not to be inspected. Therefore, since the inspection is performed only on the sheet to be inspected, it is possible to prevent or reduce the occurrence of an inspection error due to erroneous determination. Therefore, it is possible to suppress or reduce the time and effort for the user to check the inspection error due to the erroneous determination. As a result, it is possible to suppress or reduce ejection of a sheet not to be inspected as a waste sheet due to erroneous determination.

Furthermore, since the sheet S fed from the sheet feed device 100 is read by the first reader and whether or not the sheet S is the partition sheet is determined based on the read image, the controller 380) does not need to grasp the order that a partition sheet is supplied from the sheet feed device 100. Therefore, even in a case where a partition sheet arbitrarily set by the user on the sheet feed tray of the sheet feed device 100 or a partition sheet set on the manual sheet feed tray or a PI is supplied, the image forming system 30 can reliably exclude the partition sheet from sheets to be inspected. That is, the image forming system 30 can reliably exclude the partition sheet from sheets to be inspected even in a case where the controller 380 cannot grasp the order that the partition sheet is supplied.

Second Embodiment

In the first embodiment, the case where the second reader is controlled not to read the sheet based on the result of reading the sheet in the first reader has been described. In a second embodiment, contrary to the first embodiment, a case where a first reader is controlled not to read a sheet based on a result of reading the sheet in a second reader will be described.

Figure 7:
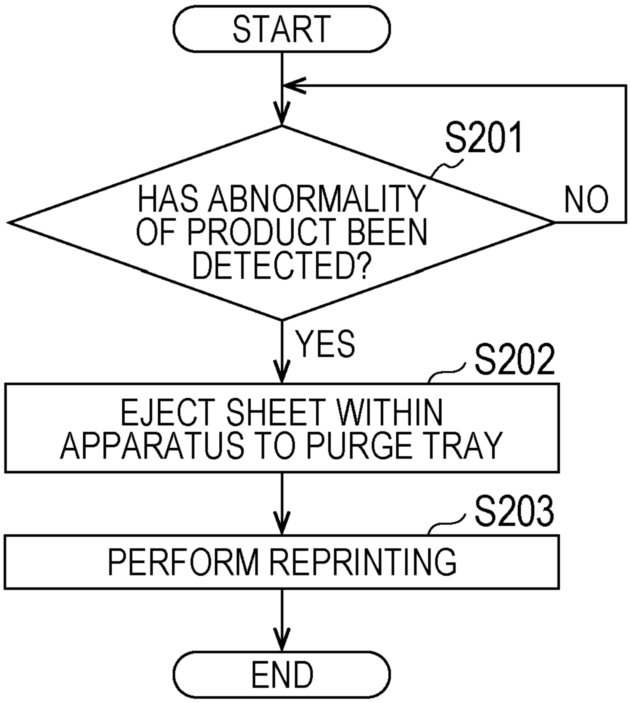
FIG. 7 is a flowchart illustrating a process procedure of a method for controlling an image forming system according to a second embodiment.

Referring to FIGS. 6 and 7, a method for controlling an image forming system 30 according to the second embodiment will be described. FIG. 7 is a flowchart illustrating a process procedure of the method for controlling the image forming system 30 according to the second embodiment. The process illustrated in FIG. 7 is implemented by cooperation of controllers 140, 250, 380, 450, and 550, and a controller 380 plays a leading role in overall control and the like. In the present embodiment, the image forming system 30 detects an abnormality of a product (sheet S) while executing the process illustrated in the flowchart of FIG. 6 in the first embodiment in parallel, and executes processing of purging a sheet following the sheet S in the apparatus in a case where the product is abnormal.

As illustrated in FIG. 7, first, the controller 380 detects whether or not the product has an abnormality (step S201). For example, as a result of the inspection in step S112 illustrated in FIG. 6, when the controller 380 detects an abnormality of the product such as a significantly low-quality product (step S201: YES), the controller 380 ejects the sheet in the apparatus to a purge tray (step S202). More specifically, the controller 380 controls a second reading device 400 and a post-processing apparatus 500 so as to eject the product (sheet S) with the detected abnormality to the purge tray of the post-processing apparatus 500 as a waste sheet. Furthermore, the controller 380 performs control such that a sheet following the sheet S being conveyed in the second reading device 400 from a sheet feed device 100 is ejected to the purge tray (not illustrated). In this case, the controller 250 controls the first reader so as not to read the sheet following the sheet S.

Next, the controller 380 performs reprinting (step S203). Since the product with the abnormality detected based on the result of reading the sheet S in the second reader has been purged, the reprinting is required. The controller 380 performs control to reprint the print image printed on the purged product (for example, executes the processing in steps S107 to S112 in FIG. 6 again).

In the above description, the case where the controller 250 controls whether or not the first reader reads the sheet S based on the result of reading the sheet S in the second reader has been exemplified, but the present embodiment is not limited to such a case. The controller 380 may be configured to control whether or not the sheet S is read by the first reader based on the result of reading the sheet S in the second reader.

The image forming system 30 according to the present embodiment configured as described above has the following effects in addition to the effects obtained in the first embodiment.

When an abnormality of the product is detected based on the result of reading the product (sheet S) in the second reader, a sheet following the sheet S being conveyed in the sheet feed device 100 or the first reading device 200 is not read by the first reader and is purged without being subjected to image formation. Thus, for example, in a case where the paper type of the sheet following the sheet S is different from the paper type of the sheet S, it is possible to prevent the print image from being formed on a sheet of a type different from the original paper type and the product from being inspected.

Third Embodiment

The first and second embodiments have described the case where, based on the result of reading the sheet by one of the first reader and the second reader, the other of the first reader and the second reader is controlled not to read the sheet. In a third embodiment, a case where a second reader changes a method (also referred to as a reading condition) for reading a sheet, based on a result of reading the sheet in a first reader will be described. In the following description, in order to avoid duplication of description, detailed description of the same configurations as those described in the first embodiment will be omitted.

Figure 8:
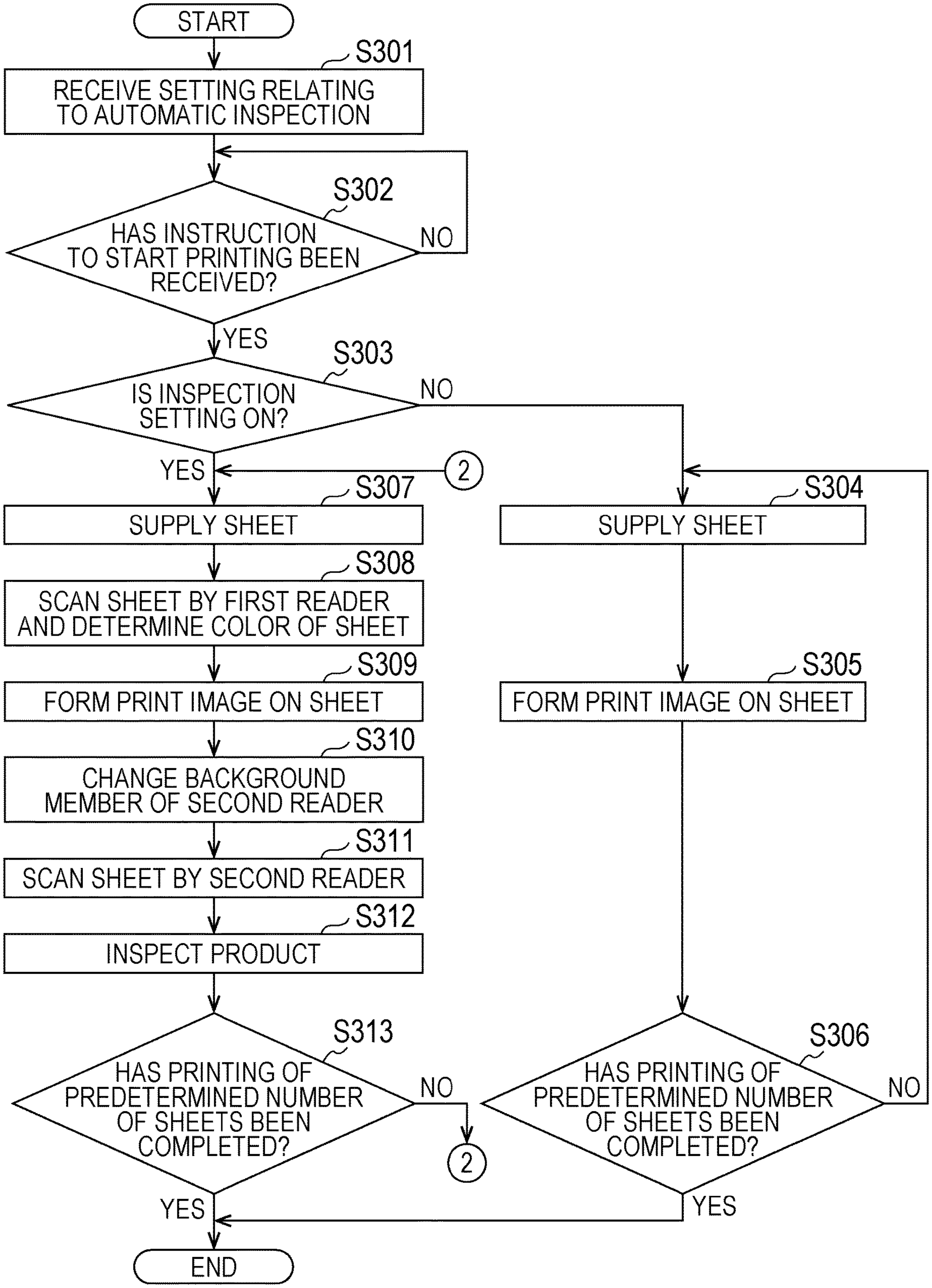
FIG. 8 is a flowchart illustrating a process procedure of a method for controlling an image forming system according to a third embodiment.

Referring to FIG. 8, a method for controlling an image forming system 30 according to the third embodiment will be described. FIG. 8 is a flowchart illustrating a process procedure of the method for controlling the image forming system 30 according to the third embodiment. The process illustrated in FIG. 8 is implemented by cooperation of controllers 140, 250, 380, 450, and 550, and a controller 380 plays a leading role in overall control and the like.

Since processing in steps S301 to S307 is identical to the processing in steps S101 to S107 illustrated in FIG. 6 in the first embodiment, a detailed description thereof will be omitted.

In step S308, the controller 250 causes the first reader to scan a sheet S and determines a color of the sheet S. For example, the controller 250 reads the sheet S supplied from the sheet feed device 100 by the first reader, and determines a color of the sheet S based on read image data of the sheet S. The result of the reading by the first reader is transmitted to the controller 450.

Next, an image forming apparatus 300 forms a print image on the sheet S (step S309). More specifically, the controller 380 controls the image former 320 to form the print image on the sheet S conveyed from the first reading device 200, based on the print image data stored in the auxiliary storage section 382. In the present embodiment, the image may be formed on a color sheet instead of the white sheet.

Next, the controller 450 changes a background member of the second reader according to the result of the reading by the first reader (step S310). For example, the controller 450 performs control so as to use a black surface of a first background member 422 as a background to read a white or light color sheet S and perform control so as to use a white surface of the first background member 422 as a background to read a black or dark color sheet S. In this case, since the contrast between the color of the sheet S and the color of the first background member 422 increases, the outline of four sides of the sheet S become clear.

Since processing in steps S311 to S313 is identical to the processing in steps S111 to S113 illustrated in FIG. 6 in the first embodiment, a detailed description thereof will be omitted.

Thus, in the process illustrated in the flowchart of FIG. 8, when an inspection setting is on, the controller 250 controls the first reader so as to read the sheet S fed from the sheet feed device 100, and determines the color of the sheet S. The controller 450 performs control to change the first background member 422 of the second reader based on the result of determining the color of the sheet S (the result of the reading by the first reader). Each process from the supply of a sheet S to the inspection of a product is repeated for a predetermined number of sheets designated by print setting data for each page of the print image data.

Note that although the case where the controller 450 changes a method for reading the sheet S by the second reader, based on the result of reading the sheet S in the first reader has been exemplified in the above description, the present invention is not limited to such a case. The controller 380 may be configured to, based on the result of reading the sheet S in the first reader, change a method for reading the sheet S by the second reader.

The image forming system 30 according to the present embodiment configured as described above has the following effects in addition to the effects described in the first and second embodiments.

The image forming system 30 changes the background member (reading method) of the second reader in accordance with the result of determining the color of the sheet S (the result of reading by the first reader), and thus the accuracy of reading the product in a second reading device 400 can be improved.

Fourth Embodiment

In a fourth embodiment, a case where a first reader changes a method for reading a sheet, based on a result of reading a sheet in a second reader will be described, which is opposite to the case described in the third embodiment. In the following description, in order to avoid duplication of description, detailed description of the same configurations as those described in the first embodiment will be omitted.

Figure 9:
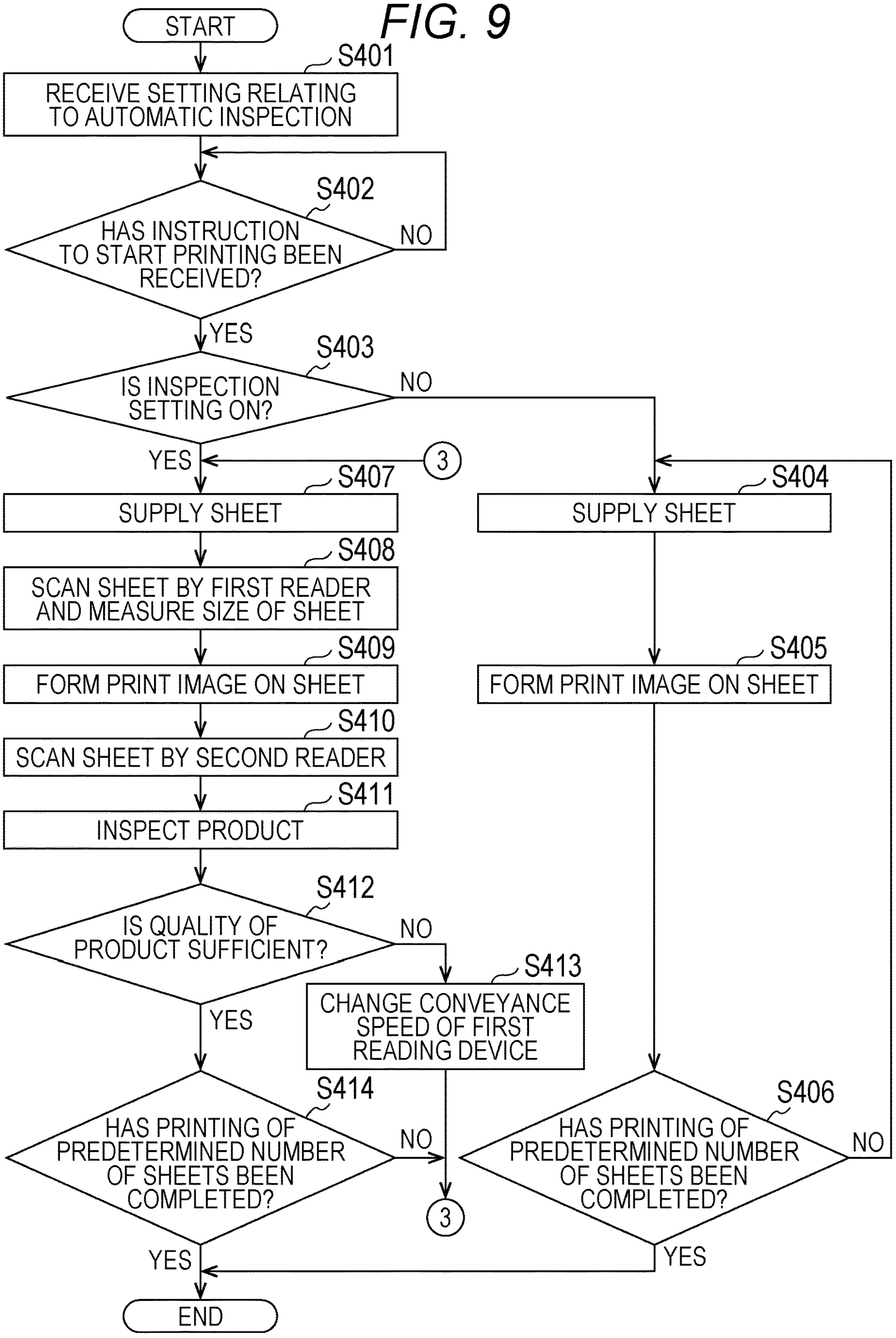
FIG. 9 is a flowchart illustrating a process procedure of a method for controlling an image forming system according to a fourth embodiment.

FIG. 9 is a flowchart illustrating a process procedure of a method for controlling an image forming system 30 according to the fourth embodiment. The process illustrated in FIG. 9 is implemented by cooperation of controllers 140, 250, 380, 450, and 550, and a controller 380 plays a leading role in overall control and the like.

Since processing in steps S401 to S407 is identical to the processing in steps S101 to S107 illustrated in FIG. 6 in the first embodiment, a detailed description thereof will be omitted.

In step S408, a first reading device 200 scans a sheet S by the first reader and measures the size of the sheet S. For example, the first reading device 200 reads the sheet S supplied from a sheet feed device 100 by the first reader, and measures the size of the sheet S based on read image data of the sheet S.

More specifically, an upper scanner 221 is configured to be able to read a region wider than the size (length and width) of the sheet S when the sheet S is conveyed on a sheet conveyance path on a first background member 222. The size of the sheet S includes four sides of the sheet S and a part of the first background member 222 in the vicinity the four sizes. Similarly, a lower scanner 231 is configured to be able to read a range that is wider than the size of the sheet S and includes the four sides of the sheet S and a part of a second background member 232 in the vicinity of the four sizes when the sheet S is conveyed on a sheet conveyance path on the second background member 232.

The upper scanner 221 reads, by an image sensor, a range wider than the width of the sheet S on the front surface (upper surface) of the sheet S in a Y direction (main scanning direction) orthogonal to an X direction (sheet conveyance direction) in which the sheet S is conveyed. The upper scanner 221 repeats reading of the sheet S a plurality of times while the sheet S is conveyed on the sheet conveyance path by a sheet conveyance section 210, thereby acquiring read image data of the front surface of the sheet S. In addition, the lower scanner 231 reads, by an image sensor, a range wider than the width of the sheet S in the width direction on the back surface (lower surface) of the sheet S. The lower scanner 231 repeats reading of the sheet S a plurality of times while the sheet S is being conveyed on the sheet conveyance path, thereby acquiring read image data of the back surface of the sheet S.

The upper scanner 221 detects the leading end and the trailing end of the sheet S, for example, based on a change in a read value of the sheet S in the sheet conveyance direction. For example, in a case where the sheet S is a white sheet and the black surface of the first background member 222 is the background, the leading end of the sheet S can be detected based on a change in the value read by the upper scanner 221 from a value indicating black to a value indicating white. Furthermore, the trailing end of the sheet S can be detected based on a change in the value read by the upper scanner 221 from the value indicating white to the value indicating black. Furthermore, the upper scanner 221 detects the left end and the right end of the sheet S based on a change in a read value in the main scanning direction for the sheet S conveyed on the sheet conveyance path. For example, the left end of the sheet S can be detected based on a change in the read value from the value indicating black to the value indicating white, and the right end of the sheet S can be detected based on a change in the read value from the value indicating white to the value indicating black.

The upper scanner 221 can calculate the size of the sheet S based on the detected leading end, trailing end, left end, and right end of the sheet S. In the present specification, the size of the sheet S means a length (hereinafter, simply referred to as a "length of the sheet") of the sheet S in the sheet conveyance direction and a length (hereinafter, referred to as a “width of the sheet”) of the sheet in the direction orthogonal to the sheet conveyance direction. More specifically, the upper scanner 221 can calculate the length of the sheet S based on a difference (time difference) in detection timing between the leading end and the trailing end of the sheet S and the sheet conveyance speed. The upper scanner 221 can calculate the width of the sheet S based on the difference between the position of the left end of the sheet S and the position of the right end of the sheet S. Further, similarly to the upper scanner 221, the lower scanner 231 can also calculate the size of the sheet S based on the leading end, the trailing end, the left end, and the right end of the sheet S.

The first reading device 200 outputs the length and the width of the sheet S measured by any one of the upper scanner 221 and the lower scanner 231. Alternatively, the first reading device 200 can be configured to output the mean value (=(L1+L2)/2) of the length (L1) of the sheet S measured by the upper scanner 221 and the length (L2) of the sheet S measured by the lower scanner 231. The first reading device 200 can also be configured to output the mean value (=(W1+W2)/2) of the width (W1) of the sheet S measured by the upper scanner 221 and the width (W2) of the sheet S measured by the lower scanner 231. The result (the size of the sheet S) of the reading by the first reader is transmitted to the controller 380.

Next, the image forming apparatus 300 forms a print image on the sheet S (step S409). More specifically, the controller 380 controls an image former 320 to form the print image on the sheet S conveyed from the first reading device 200, based on print image data stored in an auxiliary storage section 382.

Next, a second reading device 400 scans the image on the sheet S (step S410). The controller 450 controls the second reader to read the sheet S on which the image has been formed in the image forming apparatus 300, that is, a product, and transmits read image data of the product to the controller 380.

Next, the controller 380 inspects the product (step S411). To be specific, the controller 380 compares a reference image with the image on the product on a page-by-page basis, and determines whether or not the quality of the product is sufficient (step S412). For example, the controller 380 determines that the quality of the product is sufficient when the degree of match between the reference image and the image on the product is equal to or greater than a predetermined threshold, and determines that the quality of the product is not sufficient when the degree of match between the reference image and the image on the product is less than the threshold. Note that in order to distinguish between a product with insufficient quality and a product with sufficient quality, the product with insufficient quality can be ejected to a purge tray of a post-processing apparatus 500. In a case where the quality of the product is not sufficient (step S412: NO), for example, there is a possibility that the accuracy of the measurement of the size of the sheet cannot be sufficiently secured because the conveyance speed of the sheet in the first reading device 200 is too high. Therefore, in the present embodiment, the controller 250 changes the conveyance speed of the sheet when the quality of the product is not sufficient (step S413). To be more specific, in a case where the quality of the product is not sufficient, the controller 250 reduces the conveyance speed of the sheet, and returns the process to the processing in step S407.

On the other hand, when the quality of the product is sufficient (step S412: YES), the controller 380 determines whether or not printing of a predetermined number of sheets has been completed (step S414). When the printing of the predetermined number of sheets has been completed (step S414: YES), the controller 380 ends the process (end). On the other hand, when the printing of the predetermined number of sheets has not been completed (step S414: NO), the controller 380) returns the process to the processing in step S407.

As described above, in the process illustrated in the flowchart of FIG. 9, when an inspection setting is on, the controller 250 controls the first reader to read the sheet S fed from the sheet feed device 100, and measures the size of the sheet S. Further, the controller 250 performs control to change the conveyance speed (reading method) in the first reading device 200 based on the result (the result of the reading by the second reader) of determining whether or not the quality of the product is sufficient. Each process from the supply of a sheet S to the inspection of a product is repeated for a predetermined number of sheets designated by print setting data for each page of the print image data.

Note that although the case where the controller 250 changes the method for reading the sheet S by the first reader, based on the result of reading the sheet S in the second reader has been exemplified in the above description, the present embodiment is not limited to such a case. The controller 380 may be configured to change the method for reading the sheet S by the first reader, based on the result of reading the sheet S in the second reader.

The image forming system 30 according to the present embodiment configured as described above has the following effects in addition to the effects described in the first to third embodiments.

Since the image forming system 30 performs control to change the conveyance speed (reading method) in the first reading device 200 based on the result (the result of the reading by the second reader) of determining whether or not the quality of the product is sufficient, it is possible to improve the accuracy of reading the sheet S in the first reading device 200.

Fifth Embodiment

In the third and fourth embodiments, the case has been described in which, based on the result of reading the sheet in one of the first reader and the second reader, the other of the first reader and the second reader changes the method for reading the sheet. In the fifth embodiment, a case where a reading range in which a second reader reads a sheet is changed based on a result of reading the sheet in a first reader will be described. In the following description, in order to avoid duplication of description, detailed description of the same configurations as those described in the first embodiment will be omitted.

Figure 10A:
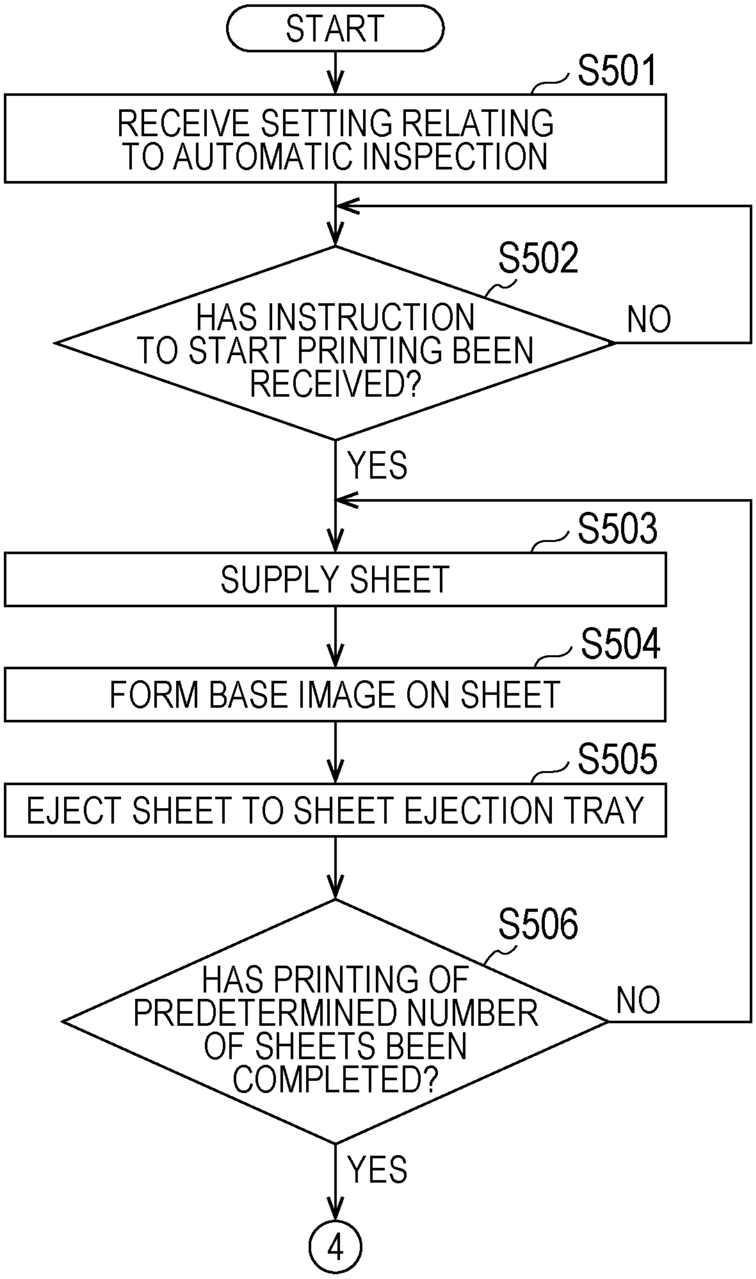
FIG. 10A is a flowchart illustrating a process procedure of a method for controlling an image forming system according to a fifth embodiment.
Figure 10B:
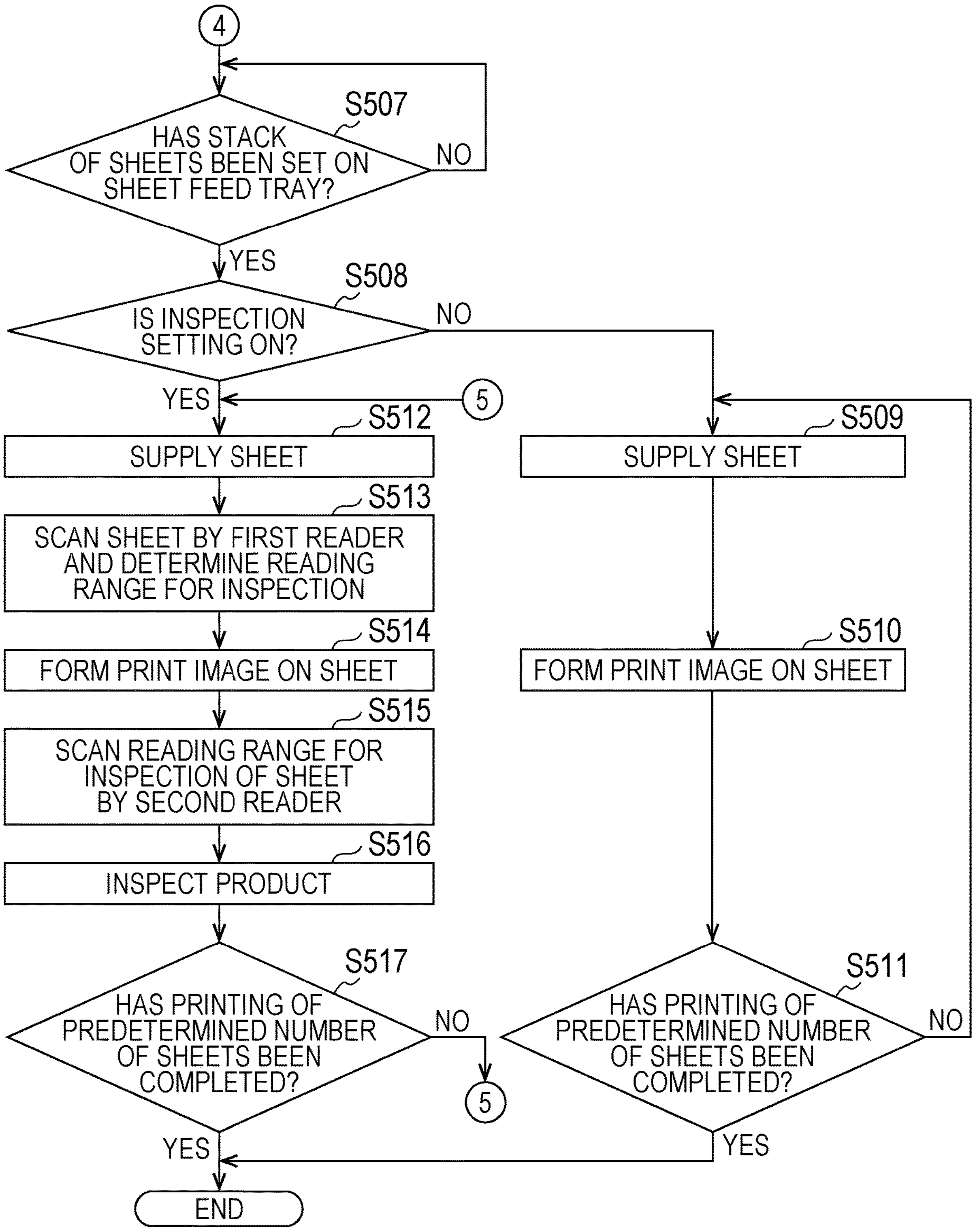
FIG. 10B is a flowchart subsequent to the flowchart illustrated in FIG. 10A.

FIG. 10A is a flowchart illustrating a process procedure of a method for controlling an image forming system 30 according to the fifth embodiment, and FIG. 10B is a flowchart subsequent to FIG. 10A. The process illustrated in FIGS. 10A and 10B is implemented by cooperation of controllers 140, 250, 380, 450, and 550, and a controller 380 plays a leading role in overall control and the like. In the present embodiment, a case where the image forming system 30 forms a base image on a predetermined number of sheets in the first printing and performs additional printing on the predetermined number of sheets on which the base image has been formed in the second printing will be described as an example.

As illustrated in FIG. 10A, first, the controller 380 receives a setting relating to automatic inspection (step S501). Since the processing in step S501 is identical to the processing in step S101 in FIG. 6 described in the first embodiment, a detailed description thereof will be omitted.

Next, the controller 380 determines whether or not an instruction to start printing has been received (step S502). The processing in step S502 is also identical to the processing in step S102 in FIG. 6 described in the first embodiment, and a detailed description thereof will be omitted.

Next, a sheet feed device 100 feeds a sheet S to a first reading device 200 (step S503). In the present embodiment, it is assumed that all of sheets S supplied by the sheet feed device 100 are white sheets and are subjected to image formation. Since the purpose of the first printing is to form the base image, the first reading device 200 does not need to scan the sheets S. Therefore, the first reading device 200 conveys the sheet S supplied from the sheet feed device 100 toward an image forming apparatus 300 as it is.

Next, the image forming apparatus 300 forms the base image on the sheet S conveyed from the first reading device 200 (step S504). Data of the base image is stored in advance in, for example, an auxiliary storage section 382. The image forming apparatus 300 feeds the sheet S on which the base image has been formed to a second reading device 400. Since it is not necessary to scan the sheet S on which the base image has been formed, the controller 450 controls the second reader and a sheet conveyance section 410 such that the sheet S is conveyed as it is toward a post-processing apparatus 500 through a sheet conveyance path.

Next, the post-processing apparatus 500 ejects the sheet S to a sheet ejection tray (step S505). The post-processing apparatus 500 ejects the sheet S conveyed from the second reading device 400 to a sheet ejection tray. Furthermore, in a case where the image forming system 30 includes a sheet ejection stacker, the sheet S on which the base image has been formed may be stacked and stored in the sheet ejection stacker.

Next, the controller 380 determines whether or not printing of a predetermined number of sheets has been completed (step S506). When the printing of the predetermined number of sheets has been completed (step S506: YES), the controller 380 advances the process to the processing in step S507. At this point in time, the predetermined number of sheets (a stack of sheets) on which the base image has been formed are stacked and placed on the sheet ejection tray in the order of ejection from the bottom. Thereafter, a user transfers the stack of sheets placed on the sheet ejection tray to a sheet feed tray of the sheet feed device 100 and sets the stack of sheets on the sheet feed tray. At that time, for example, the controller 380 allows the user to reverse the top and bottom of the stack of sheets placed on the sheet ejection tray and then set the stack of sheets on the sheet feed tray. As a result, since the sheets are arranged on the sheet feed tray in the reversed order, the order in which the sheets are printed in the first printing can be matched with the order in which the sheets are printed in the second printing described below.

Note that instead of setting the stack of sheets upside down on the sheet feed tray, a management number may be given (printed) in a region such as a margin portion of each of the sheets S when the image forming apparatus 300 forms the base image, and the order of the sheets may be managed according to the management number. The management number may be letters such as numerals recognizable by a person, a barcode, or the like.

On the other hand, when the printing of the predetermined number of sheets has not been completed (step S506: NO), the controller 380 returns the process to the processing in step S503.

Next, as illustrated in FIG. 10B, the controller 140 determines whether the stack of sheets has been set on the sheet feed tray (step S507). When the stack of sheets has not been set on the sheet feed tray (step S507: NO), the controller 380 waits until the stack of sheets is set on the sheet feed tray. On the other hand, when the stack of sheets has been set on the sheet feed tray (step S507: YES), the controller 380 determines whether or not an inspection setting is on (step S508). When the inspection setting is not on, that is, the inspection setting is off (step S508: NO), the controller 380 controls the sheet feed device 100 to supply a sheet S to the first reading device 200 (step S509). Since the inspection setting is off, the controller 250 controls the first reader and a sheet conveyance section 210 so as to convey the sheet S toward the image forming apparatus 300 without reading the sheet S.

Next, the image forming apparatus 300 forms a print image on the sheet S (step S510). More specifically, the controller 380 controls an image former 320 to form the print image on the sheet S conveyed from the first reading device 200, based on print image data stored in the auxiliary storage section 382.

Next, the controller 380 determines whether or not printing of the predetermined number of sheets has been completed (step S511). When the printing of the predetermined number of sheets has been completed (step S511: YES), the controller 380 ends the process (end). On the other hand, when the printing of the predetermined number of sheets has not been completed (step S511: NO), the controller 380 returns the process to the processing in step S509, and continues supply of a sheet and formation of an image.

On the other hand, when the inspection setting is on (step S508: YES), the controller 380 controls the sheet feed device 100 so as to supply the sheet S to the first reading device 200 (step S512).

Next, the first reading device 200 scans the sheet S by the first reader and determines a reading range for inspection (step S513). For example, the controller 250 controls the first reader so as to read the sheet S on which the base image has been formed by the image forming apparatus 300, and acquires a region on which the base image has been formed, based on read image data of the sheet S. The controller 250 determines the reading range for inspection based on the region where the base image has been formed. More specifically, the controller 250 determines the image region of the sheet S excluding the region where the base image is formed as the reading range for inspection, and transmits the position of the reading range for inspection (for example, upper left and the lower right coordinates of the reading range for inspection) to the controller 450.

Next, the image forming apparatus 300 forms a print image on the sheet S (step S514). More specifically, the controller 380 controls the image former 320 so as to form the print image on the sheet conveyed from the first reading device 200, based on the print image data stored in the auxiliary storage section 382.

Next, the second reading device 400 scans the image on the sheet S (step S515). The controller 450 generates inspection image data by excluding (masking) a portion other than the reading range for inspection from the read image, and transmits the inspection image data to the controller 380.

The read image is an image obtained by reading, by the second reader, the sheet S on which the image has been formed in the image forming apparatus 300, that is, a product.

Note that in the case of using a sensor that reads an image by scanning pixels in an X direction as an image sensor instead of using a line sensor, the reading range of the sheet S may be read by scanning the pixels in the X direction, and the inspection image data may be generated based on the read image.

Next, the controller 380 inspects the product (step S516). More specifically, the controller 380 compares the inspection image with a reference image on a page-by-page basis and determines, based on the degree of match between the two images, whether or not the product has an abnormality. Here, the reference image according to the present embodiment is a region corresponding to the reading range for inspection of the read image obtained by reading the print image whose quality has been checked by the user. For example, the controller 380) determines that there is no abnormality in the product when the degree of match between the two images is equal to or greater than a predetermined threshold, and determines that there is an abnormality in the product when the degree of match between the two images is less than the threshold. Note that a product in which an abnormality is recognized can be ejected to a purge tray of the post-processing apparatus 500 in order to distinguish the abnormal product from a normal product.

Next, the controller 380 determines whether or not printing of the predetermined number of sheets has been completed (step S517). When the printing of the predetermined number of sheets has been completed (step S517: YES), the controller 380) ends the process (end). On the other hand, when the printing of the predetermined number of sheets has not been completed (step S517: NO), the controller 380 returns the process to the processing in step S512.

In this way, in the process illustrated in the flowchart of FIG. 10A, the controller 380 controls the image former 320 to form the base image on the predetermined number of sheets S. Furthermore, in the process illustrated in the flowchart of FIG. 10B, when the inspection setting is on, the controller 250) performs control to read each sheet S on which the base image has been formed and determine a reading range for inspection. Subsequently, the controller 380) controls the image former 320 so as to form a print image on the sheet S on which the base image has been formed. Furthermore, the controller 450) controls the second reader so as to scan the reading range for inspection of the sheet S on which the print image has been formed. The controller 380 inspects the product by comparing the inspection image with the reference image. Each process from the supply of a sheet S to the inspection of a product is repeated for a predetermined number of sheets designated by print setting data for each page of the print image data.

Note that in the above description, the case where the controller 450 changes the range in which the sheet S is read by the second reader, based on the result of reading the sheet S in the first reader has been exemplified. However, the present invention is not limited to such a case. The controller 380 may be configured to change the range in which the sheet S is read by the second reader, based on the result of reading the sheet S in the first reader. Further, the controller 380 or the controller 450 may be configured to change the inspection range in the second reader based on the result of reading the sheet S in the first reader.

Furthermore, although the case where the inspection is performed by comparing the reference image with the inspection image has been described as an example, the present embodiment is not limited to such a case. For example, the controller 380 may be configured to use a composite image obtained by synthesizing the base image and the print image as a reference image and compare the reference image with the image on the product for inspection.

In addition, the case in which the base image is formed on the sheet S in the first printing by the image forming system 30, the print image is formed on the sheet S in the second printing, that is, the additional printing is performed, and the inspection is performed has been described as an example. However, the present embodiment is not limited to such a case. For example, the image forming system 30 according to the present embodiment can also be applied to a case where a print image is formed on a sheet (postcard or the like) having a design or a pattern, and inspection is performed.

Furthermore, although the case where the additional printing is performed using the one image forming system 30 has been described as an example, the present embodiment is not limited to such a case. For example, two image forming systems connected to a printer controller 20 may be used such that a first base image is formed by the first image forming system and a second print image is formed by the second image forming system. A specific example of such a configuration includes a printing system that prints a large amount of direct mail. In this printing system, a fixed image (text or the like) is formed on a plurality of sheets by an offset printing machine (first image forming system), and then a variable image (address or the like) is formed on the plurality of sheets by a digital printing machine (second image forming system).

The image forming system 30 according to the present embodiment configured as described above has the following effects in addition to the effects obtained in the first embodiment.

Based on the result of reading the sheet S in the first reader, the image forming system 30 changes the reading range in which the second reader reads the sheet S, from the entire surface of the sheet to a region where no base image is formed. Therefore, the image forming system 30 can inspect the image on the product in an appropriate range. Therefore, it is possible to improve the accuracy of inspecting the product.

Sixth Embodiment

In a sixth embodiment, a case where a reading range in which a first reader reads a sheet is changed based on a result of reading the sheet in a second reader will be described, which is opposite to the case described in the fifth embodiment. In the following description, in order to avoid duplication of description, detailed description of the same configurations as those described in the first embodiment will be omitted.

Figure 11A:
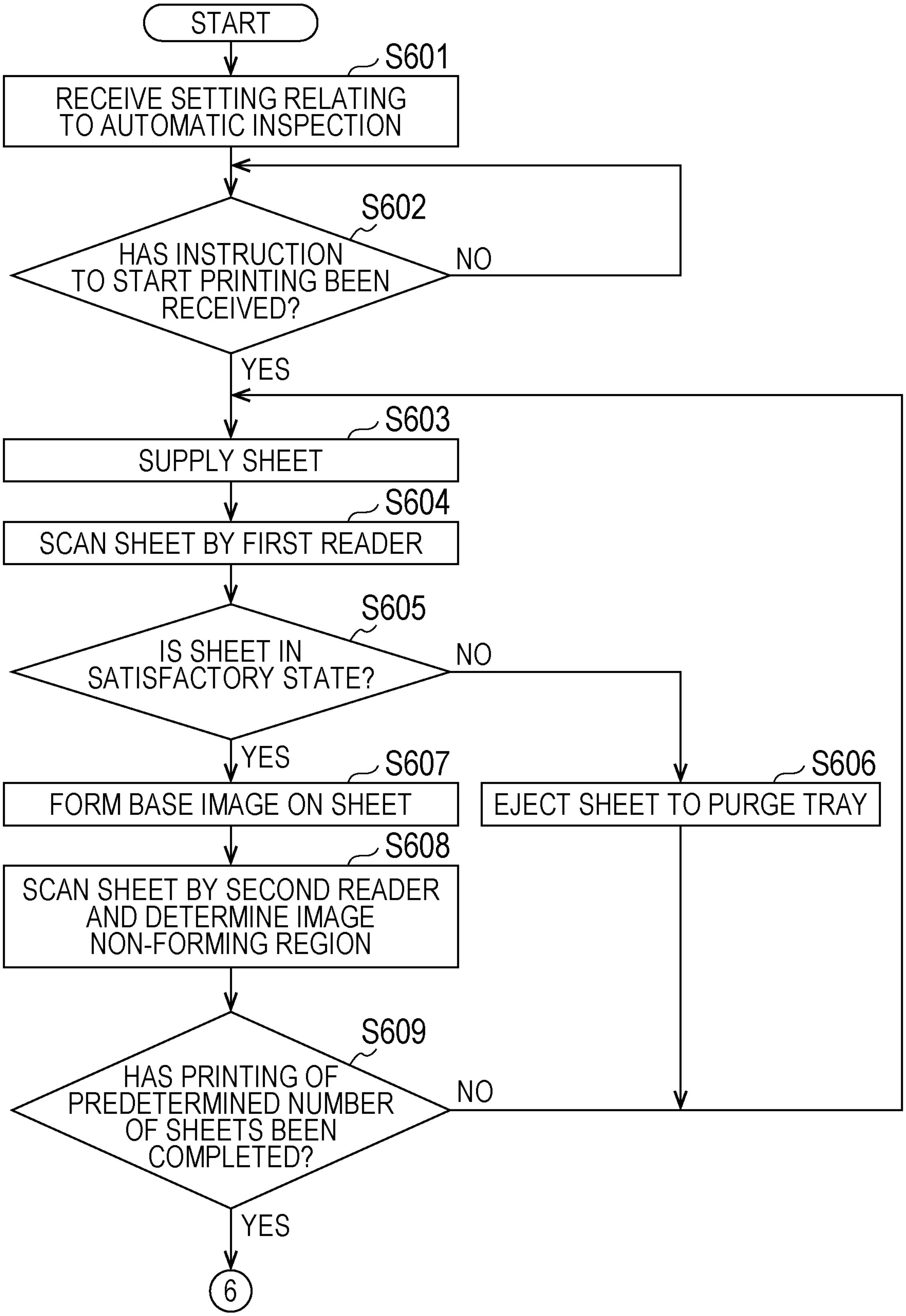
FIG. 11A is a flowchart illustrating a process procedure of a method for controlling an image forming system according to a sixth embodiment.
Figure 11B:
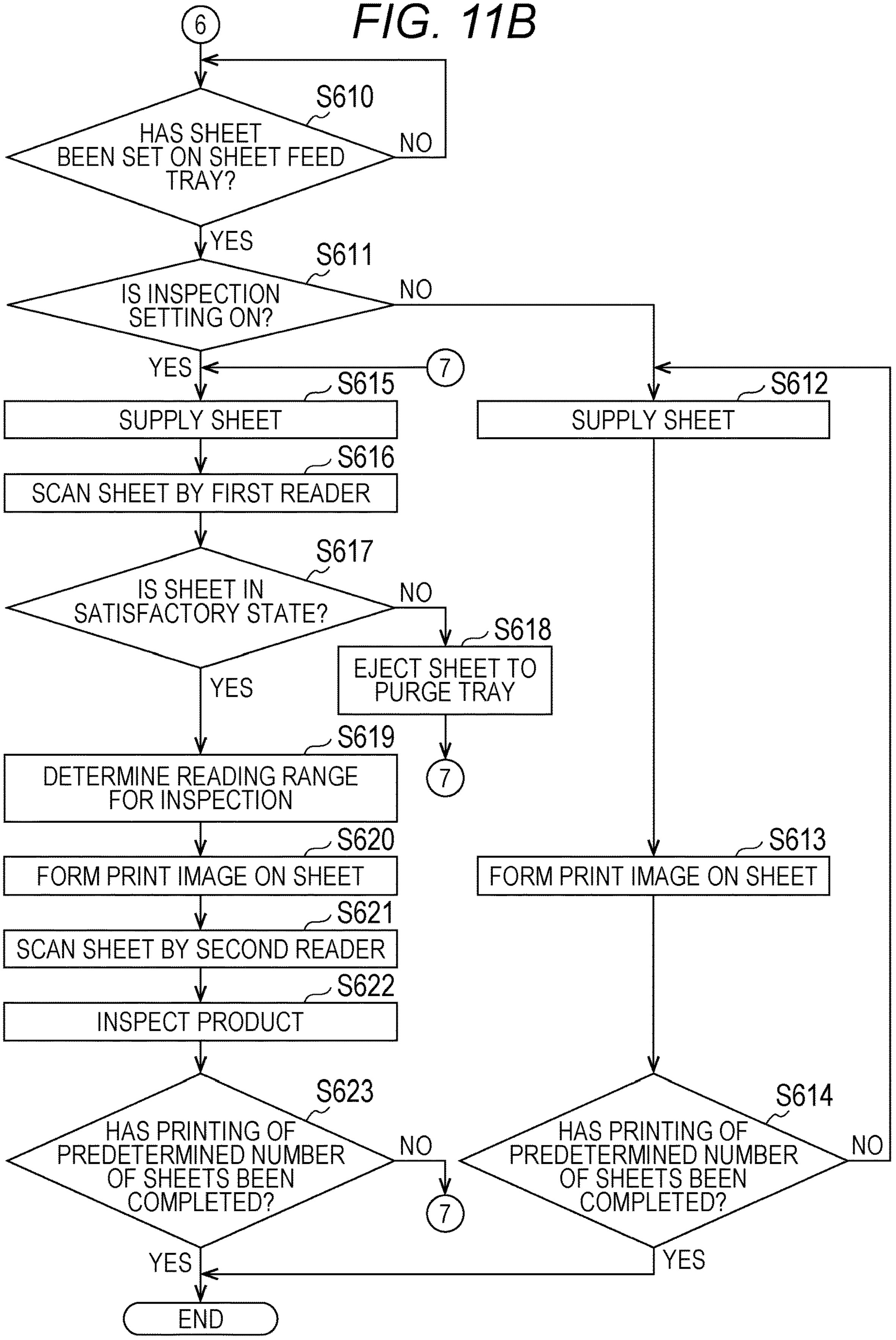
FIG. 11B is a flowchart subsequent to the flowchart illustrated in FIG. 11A.

FIG. 11A is a flowchart illustrating a process procedure of a method for controlling an image forming system 30 according to the sixth embodiment, and FIG. 11B is a flowchart subsequent to FIG. 11A. The process illustrated in FIGS. 11A and 11B are implemented by cooperation of controllers 140, 250, 380, 450, and 550, and a controller 380 plays a leading role in overall control and the like. In the present embodiment, similarly to the fifth embodiment, a case where the image forming system 30 forms a base image on a predetermined number of sheets in the first printing and performs additional printing on the predetermined number of sheets on which the base image has been formed in the second printing will be described as an example.

As illustrated in FIG. 11A, first, the controller 380 receives a setting relating to automatic inspection (step S601). Since the processing in step S601 is identical to the processing in step S101 in FIG. 6 described in the first embodiment, a detailed description thereof will be omitted.

Next, the controller 380 determines whether or not an instruction to start printing has been received (step S602). The processing in step S602 is also identical to the processing in step S102 in FIG. 6 described in the first embodiment, and a detailed description thereof will be omitted.

Next, a sheet feed device 100 feeds a sheet S to a first reading device 200 (step S603). In the present embodiment, similarly to the fifth embodiment, it is assumed that all the sheets S supplied by the sheet feed device 100 are white sheets. The controller 250 controls a sheet conveyance section 210 such that the sheet S supplied from the sheet feed device 100 is conveyed toward an image forming apparatus 300 as it is.

Next, the first reading device 200 scans the sheet S (step S604). For example, the controller 250 controls the first reader so as to read the sheet S supplied from the sheet feed device 100, and acquires read image data of the sheet S.

Next, the controller 250 determines whether or not the sheet is in a satisfactory state (step S605). More specifically, the controller 250 determines, based on a read image acquired by the first reader, whether the sheet S is in a satisfactory state. When the sheet S is not in a satisfactory state (step S605: NO), the controller 250 ejects the sheet S to a purge tray (not illustrated) of the first reading device 200 (step S606), and returns the process to step S603. The fact that the sheet S is not in a satisfactory state means, for example, a state in which dirt adheres to the sheet S or the sheet S is damaged. The fact that the sheet S is in a satisfactory state means that the sheet S is free from dirt and a scratch.

For example, when the sheet S is a white sheet, the read image is considered to be substantially white. For example, in a case where each of RGB of pixels is represented by 8 bits, values of all the pixels are close to 255 in a case where there is no dirt or scratch on the sheet S, but values of pixels in a dirt or scratch portion can be smaller than 255 in a case where there is dirt or scratch on the sheet S.

On the other hand, when the sheet S is in a satisfactory state (step S605: YES), the image forming apparatus 300 forms a base image on the sheet S (step S607). More specifically, the controller 380 controls an image former 320 to form the base image on the sheet S conveyed from the first reading device 200, based on base image data stored in an auxiliary storage section 382.

Next, a second reading device 400 scans the image on the sheet S and determines an image non-forming region (step S608). For example, the controller 450 controls the second reader so as to read the sheet S on which the base image has been formed by the image forming apparatus 300, and acquires a region where the base image has been formed, based on read image data acquired by the second reader. Further, the controller 450) determines an image non-forming region excluding the region where the base image has been formed on the sheet S based on the region where the base image has been formed. The controller 450 transmits the position of the image non-forming region (for example, upper left and lower right coordinates of the image non-forming region) to the controller 250.

Next, the controller 380 determines whether or not printing of a predetermined number of sheets has been completed (step S609). When the printing of the predetermined number of sheets has been completed (step S609: YES), the controller 380 advances the process to processing in step S610. At this point in time, the predetermined number of sheets (a stack of sheets) on which the base image has been formed are stacked and placed on the sheet ejection tray in the order of ejection from the bottom. On the other hand, when the printing of the predetermined number of sheets has not been completed (step S609: NO), the controller 380 returns the process to the processing in step S603.

Next, as illustrated in FIG. 11B, the controller 140 determines whether or not the stack of sheets has been set on a sheet feed tray (step S610). When the stack of sheets has not been set in the sheet feed tray (step S610: NO), the controller 380 waits until the stack of sheets is set on the sheet feed tray. On the other hand, when the stack of sheets has been set on the sheet feed tray (step S610: YES), the controller 380 determines whether or not an inspection setting is on (step S611). When the inspection setting is not on, that is, the inspection setting is off (step S611: NO), the controller 380 controls the sheet feed device 100 to supply the sheet S to the first reading device 200 (step S612). Since the inspection setting is off, the controller 250 controls the first reader and a sheet conveyance section 210 so as to convey the sheet S toward the image forming apparatus 300 without reading the sheet S.

Next, the image forming apparatus 300 forms a print image on the sheet S (step S613). More specifically, the controller 380 controls the image former 320 to form the print image on the sheet S conveyed from the first reading device 200, based on print image data stored in the auxiliary storage section 382.

Next, the controller 380 determines whether or not printing of the predetermined number of sheets has been completed (step S614). When the printing of the predetermined number of sheets has been completed (step S614: YES), the controller 380 ends the process (end). On the other hand, when the printing of the predetermined number of sheets has not been completed (step S614: NO), the controller 380 returns the process to the processing in step S612 and continues the supply of a sheet and the formation of an image.

On the other hand, when the inspection setting is on (step S611: YES), the controller 380 controls the sheet feed device 100 so as to supply the sheet S to the first reading device 200 (step S615).

Next, the first reading device 200 scans the sheet by the first reader (step S616). The controller 250 controls the first reader to read the sheet S on which the base image has been formed by the image forming apparatus 300.

In addition, the controller 250 masks a region other than the image non-forming region (that is, a region in which the base image is formed) for the read image obtained by reading the sheet S. Thus, in the following step S617, it is possible to prevent a region in which the base image has been formed on the sheet S from being erroneously determined to be dirt or a scratch. As described above, in the present embodiment, the controller 250 masks the region other than the image non-forming region based on the result (image non-forming region) of reading the sheet S in the second reader. Thus, the controller 250 changes the reading range in which the first reader reads the sheet S.

Next, the controller 250 determines whether or not the sheet S is in a satisfactory state (step S617). More specifically, the controller 250 determines, based on a read image acquired by the first reader, whether the sheet S is in a satisfactory state. In a case where it is determined that the sheet S is not in a satisfactory state (step S617: NO), the controller 250) ejects the sheet S to the purge tray (not illustrated) of the first reading device 200 (step S618), and returns the process to step S615. The controller 250 determines whether or not the sheet is in a satisfactory state before the second printing. Thus, the controller 250 can, for example, purge a sheet to which toner has erroneously adhered in the first printing or a sheet that has been damaged during conveyance of a stack of sheets after the first printing.

On the other hand, when the sheet S is in a satisfactory state (step S617: YES), the controller 250) determines the reading range for inspection (step S619). The controller 250) acquires the region where the base image has been formed based on the read image data of the sheet S by the first reader, and determines the reading range for inspection based on the region where the base image has been formed. More specifically, the controller 250) determines an image region excluding the region where the base image has been formed on the sheet S as the reading range for inspection. The controller 250 transmits, to the controller 450, the position of the reading range for inspection (for example, upper left and lower right coordinates of the reading range for inspection).

Next, the image forming apparatus 300 forms a print image on the sheet S (step S620). More specifically, the controller 380 controls the image former 320 to form the print image on the sheet S conveyed from the first reading device 200, based on print image data stored in the auxiliary storage section 382.

Next, the second reading device 400 scans the image on the sheet (step S621). The second reading device 400 generates inspection image data by excluding (masking) a portion other than the reading range for inspection from a read image obtained by reading, by the second reader, the sheet on which the image has been formed in the image forming apparatus 300, that is, a product. The second reading device 400 transmits the inspection image data to the controller 380. Note that instead of using a line sensor as an image sensor, a sensor that reads an image by scanning pixels in the X direction can be used. In this case, the second reading device 400 may be configured to read the reading range of the sheet S for inspection by scanning pixels in the X direction and to generate the inspection image data based on the read image.

Next, the controller 380 inspects the product (step S622). More specifically, the controller 380 compares the inspection image with the reference image on a page-by-page basis and determines, based on the degree of match between the two images, whether an abnormality is present in a page of the product.

Next, the controller 380 determines whether or not printing of a predetermined number of sheets has been completed (step S623). When the printing of the predetermined number of sheets has been completed (step S623: YES), the controller 380 ends the process (end). On the other hand, when the printing of the predetermined number of sheets has not been completed (step S623: NO), the controller 380 returns the process to the processing in step S615.

In this way, in the process illustrated in the flowchart of FIG. 11A, the controller 250 determines whether or not the sheet S is in a satisfactory state based on the image read by the first reader. Next, when the sheet S is in a satisfactory state, the controller 380 controls the image former 320 so as to form the base image on the predetermined number of sheets S. In addition, the controller 380 determines the image non-forming region in which the base image is not formed on the sheet S based on the image read by the second reader. Furthermore, in the process illustrated in the flowchart of FIG. 11B, when the inspection setting is on, the controller 380 controls the first reading device 200 so as to read each sheet S on which the base image has been formed and determine a reading range for inspection. Subsequently, the controller 250 determines whether or not the sheet S is in a satisfactory state based on the image read by the first reader. When the sheet S is in a satisfactory state, the controller 380 controls the image former 320 so as to form a print image on the sheet S on which the base image has been formed. Furthermore, the controller 380 controls the second reading device 400 so as to read the image on the sheet S after the image formation, and compares the inspection image with the reference image to inspect the product. Each process from the supply of a sheet S to the inspection of a product is repeated for a predetermined number of sheets designated by print setting data for each page of the print image data.

Note that although the case where the controller 380 changes the reading range in which the first reader reads the sheet S based on the result of reading the sheet S in the second reader has been described as an example, the present embodiment is not limited to such a case. For example, the controller 450 may be configured to change the reading range in which the first reader reads the sheet S based on the result of reading the sheet S in the second reader.

The image forming system 30 according to the present embodiment configured as described above produces the following effects.

Based on the result of reading the sheet in the second reader, the first reader changes the reading range in which the sheet S is read, from the entire surface of the sheet to a region where no base image is formed. Therefore, it is possible to prevent a state of a sheet S from being erroneously determined to be defective in the second printing. Therefore, the sheet S in an unsatisfactory state can be reliably purged.

As described above, in each of the embodiments, the image forming system 30 and the method for controlling the image forming system 30 have been described. However, regarding the present invention, it is needless to say that those skilled in the art can appropriately make addition, modification, and omission within the scope of the technical idea thereof.

Furthermore, the control programs may be provided by a computer-readable recording medium, such as a USB memory, a flexible disk, or a CD-ROM, or may be provided online via a network, such as the Internet. In this case, the programs recorded on the computer-readable recording medium are usually transferred to and stored in a memory, a storage, or the like. Furthermore, the control programs may be provided, for example, as independent application software, or may be incorporated, as one function of the server, into software of each device.

Furthermore, a part or a whole of the processes performed by the control programs in the embodiments can be performed in the form of hardware such as circuits.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming system comprising:

an image former that forms an image on a recording medium;

a first reading device that is disposed upstream of the image former in a conveyance direction of the recording medium and reads the recording medium; and a second reading device that is disposed downstream of the image former in the conveyance direction of the recording medium and reads the recording medium, wherein one of the first reading device and the second reading device is controlled based on a result of reading the recording medium in the other of the first reading device and the second reading device.

2. The image forming system according to claim 1, wherein based on a result of reading the recording medium in one of the first reading device and the second reading device, the other of the first reading device and the second reading device does not read the recording medium.

3. The image forming system according to claim 1, wherein based on a result of reading the recording medium in one of the first reading device and the second reading device, the other of the first reading device and the second reading device changes a method for reading the recording medium.

4. The image forming system according to claim 1, wherein based on a result of reading the recording medium in one of the first reading device and the second reading device, the other of the first reading device and the second reading device changes a reading range in which the recording medium is read.

5. The image forming system according to claim 1, wherein the first reading device includes a first reader.

6. The image forming system according to claim 1, wherein the second reading device includes a second reader.

7. A method for controlling an image forming system including an image former that forms an image on a recording medium, a first reading device that is disposed upstream of the image former in a conveyance direction of the recording medium and reads the recording medium, and a second reading device that is disposed downstream of the image former in the conveyance direction of the recording medium and reads the recording medium, the method comprising controlling one of the first reading device and the second reading device based on a result of reading the recording medium in the other of the first reading device and the second reading device.

8. The method of claim 7, wherein the controlling comprises controlling one of the first reading device and the second reading device not to read the recording medium.

9. The method of claim 7, wherein the controlling comprises changing a method by which one of the first reading device and the second reading device reads the recording medium.

10. The method of claim 7, wherein the controlling comprises changing a reading range of one of the first reading device and the second reading device in which the recording medium is read.

11. The method of claim 7, wherein the first reading device includes a first reader.

12. The method of claim 7, wherein the second reading device includes a second reader.

* * * * *